US012442640B2

(12) United States Patent
Fay et al.

(10) Patent No.: US 12,442,640 B2
(45) Date of Patent: Oct. 14, 2025

(54) INTERMEDIATE WAYPOINT GENERATOR

(71) Applicant: Boston Dynamics, Inc., Waltham, MA (US)

(72) Inventors: Gina Christine Fay, Lexington, MA (US); Alfred Rizzi, Cambridge, MA (US)

(73) Assignee: Boston Dynamics, Inc., Waltham, MA (US)

( * ) Notice: Subject to any disclaimer, the term of this patent is extended or adjusted under 35 U.S.C. 154(b) by 87 days.

(21) Appl. No.: 18/456,349

(22) Filed: Aug. 25, 2023

(65) Prior Publication Data
US 2023/0400307 A1 Dec. 14, 2023

Related U.S. Application Data

(63) Continuation of application No. 17/649,620, filed on Feb. 1, 2022, now Pat. No. 11,774,247, which is a (Continued)

(51) Int. Cl.
G01C 21/20 (2006.01)
G05D 1/00 (2006.01)

(52) U.S. Cl.
CPC ........... *G01C 21/20* (2013.01); *G05D 1/0088* (2013.01); *G05D 1/0214* (2013.01)

(58) Field of Classification Search
CPC .... G01C 21/20; G05D 1/0088; G05D 1/0214; G05D 1/0248; G05D 1/0274;
(Continued)

(56) References Cited

U.S. PATENT DOCUMENTS 5,111,401 A 5/1992 Everett et al.
5,378,969 A 1/1995 Haikawa
(Continued)

FOREIGN PATENT DOCUMENTS

CA 2928262 7/2012
CN 102037317 A 4/2011
(Continued)

OTHER PUBLICATIONS

Liu et al., "Behavior-based navigation system of mobile robot in unknown environment", Industrial Control Comp. Dec. 25, 2017; 12: 28-30.
(Continued)

*Primary Examiner* — Richard M Camby
(74) *Attorney, Agent, or Firm* — Knobbe, Martens, Olson & Bear, LLP

(57) ABSTRACT

A method for generating intermediate waypoints for a navigation system of a robot includes receiving a navigation route. The navigation route includes a series of high-level waypoints that begin at a starting location and end at a destination location and is based on high-level navigation data. The high-level navigation data is representative of locations of static obstacles in an area the robot is to navigate. The method also includes receiving image data of an environment about the robot from an image sensor and generating at least one intermediate waypoint based on the image data. The method also includes adding the at least one intermediate waypoint to the series of high-level waypoints of the navigation route and navigating the robot from the starting location along the series of high-level waypoints and the at least one intermediate waypoint toward the destination location.

23 Claims, 22 Drawing Sheets

Related U.S. Application Data continuation of application No. 16/569,885, filed on Sep. 13, 2019, now Pat. No. 11,268,816.

(60) Provisional application No. 62/883,438, filed on Aug. 6, 2019.

(58) Field of Classification Search
CPC .......... G05B 2219/40519; B25J 9/1664; B25J 9/1697; B62D 57/032
See application file for complete search history.

(56) References Cited

U.S. PATENT DOCUMENTS

| | | |
|---|---|---|
| 7,211,980 B1 | 5/2007 | Bruemmer et al. |
| 7,865,267 B2 | 1/2011 | Sabe et al. |
| 7,912,583 B2 | 3/2011 | Gutmann et al. |
| 8,270,730 B2 | 9/2012 | Watson |
| 8,346,391 B1 | 1/2013 | Anhalt et al. |
| 8,401,783 B2 | 3/2013 | Hyung et al. |
| 8,548,734 B2 | 10/2013 | Barbeau et al. |
| 8,849,494 B1 | 9/2014 | Herbach et al. |
| 8,930,058 B1 | 1/2015 | Quist et al. |
| 9,352,470 B1 | 5/2016 | da Silva et al. |
| 9,561,592 B1 | 2/2017 | Silva et al. |
| 9,574,883 B2 | 2/2017 | Watts et al. |
| 9,586,316 B1* | 3/2017 | Swilling ................ B25J 9/1664 |
| 9,594,377 B1 | 3/2017 | Perkins et al. |
| 9,717,387 B1 | 8/2017 | Szatmary et al. |
| 9,844,879 B1 | 12/2017 | Cousins et al. |
| 9,896,091 B1 | 2/2018 | Kurt et al. |
| 9,908,240 B1 | 3/2018 | da Silva et al. |
| 9,910,441 B2* | 3/2018 | Levinson ............ B60W 60/0027 |
| 9,933,781 B1 | 4/2018 | Bando et al. |
| 9,969,086 B1 | 5/2018 | Whitman |
| 9,975,245 B1 | 5/2018 | Whitman |
| 10,054,447 B2* | 8/2018 | Hong .................... G05D 1/0212 |
| 10,081,098 B1 | 9/2018 | Nelson et al. |
| 10,081,104 B1 | 9/2018 | Swilling |
| 10,226,870 B1 | 3/2019 | Silva et al. |
| 10,639,794 B2 | 5/2020 | Cousins et al. |
| 11,175,664 B1 | 11/2021 | Boyraz et al. |
| 11,268,816 B2 | 3/2022 | Fay et al. |
| 11,287,826 B2 | 3/2022 | Whitman et al. |
| 11,416,003 B2 | 8/2022 | Whitman et al. |
| 11,480,974 B2 | 10/2022 | Lee et al. |
| 11,518,029 B2 | 12/2022 | Cantor et al. |
| 11,656,630 B2 | 5/2023 | Jonak et al. |
| 11,747,825 B2 | 9/2023 | Jonak et al. |
| 11,774,247 B2 | 10/2023 | Fay et al. |
| 12,222,723 B2 | 2/2025 | Yamauchi |
| 12,304,082 B2 | 5/2025 | Merewether |
| 2005/0131581 A1 | 6/2005 | Sabe et al. |
| 2006/0009876 A1 | 1/2006 | McNeil |
| 2006/0025888 A1 | 2/2006 | Gutmann et al. |
| 2006/0167621 A1 | 7/2006 | Dale |
| 2007/0233338 A1 | 10/2007 | Ariyur et al. |
| 2007/0282564 A1 | 12/2007 | Sprague et al. |
| 2008/0009966 A1 | 1/2008 | Bruemmer et al. |
| 2008/0027590 A1 | 1/2008 | Phillips et al. |
| 2008/0086241 A1 | 4/2008 | Phillips et al. |
| 2009/0125225 A1 | 5/2009 | Hussain et al. |
| 2010/0066587 A1 | 3/2010 | Yamauchi et al. |
| 2010/0172571 A1 | 7/2010 | Yoon et al. |
| 2011/0035087 A1 | 2/2011 | Kim et al. |
| 2011/0172850 A1 | 7/2011 | Paz-Meidan et al. |
| 2011/0224901 A1 | 9/2011 | Aben et al. |
| 2012/0089295 A1 | 4/2012 | Ahn et al. |
| 2012/0182392 A1 | 7/2012 | Kearns et al. |
| 2013/0141247 A1 | 6/2013 | Ricci |
| 2013/0231779 A1 | 9/2013 | Purkayastha et al. |
| 2013/0323432 A1 | 12/2013 | Rygas et al. |
| 2013/0325244 A1 | 12/2013 | Wang et al. |
| 2014/0188325 A1 | 7/2014 | Johnson et al. |
| 2015/0158182 A1 | 6/2015 | Farlow et al. |
| 2015/0355638 A1 | 12/2015 | Field et al. |
| 2016/0375901 A1 | 12/2016 | di Cairano et al. |
| 2017/0017236 A1 | 1/2017 | Song et al. |
| 2017/0095383 A1 | 4/2017 | Li et al. |
| 2017/0120448 A1 | 5/2017 | Lee et al. |
| 2017/0131102 A1 | 5/2017 | Wirbel et al. |
| 2017/0165835 A1* | 6/2017 | Agarwal .............. B25J 9/1666 |
| 2017/0203446 A1 | 7/2017 | Dooley et al. |
| 2017/0341235 A1* | 11/2017 | Baloch .................. G05D 1/0248 |
| 2018/0051991 A1* | 2/2018 | Hong .................. G01C 21/3446 |
| 2018/0161986 A1 | 6/2018 | Kee et al. |
| 2018/0173242 A1 | 6/2018 | Lalonde et al. |
| 2018/0328737 A1 | 11/2018 | Frey et al. |
| 2018/0348742 A1 | 12/2018 | Byrne et al. |
| 2019/0056743 A1 | 2/2019 | Alesiani et al. |
| 2019/0079523 A1 | 3/2019 | Zhu et al. |
| 2019/0080463 A1 | 3/2019 | Davison et al. |
| 2019/0113927 A1 | 4/2019 | England et al. |
| 2019/0138029 A1 | 5/2019 | Ryll et al. |
| 2019/0171911 A1 | 6/2019 | Greenberg |
| 2019/0187699 A1 | 6/2019 | Salour et al. |
| 2019/0187703 A1* | 6/2019 | Millard .................. G05D 1/249 |
| 2019/0213896 A1 | 7/2019 | Gohi et al. |
| 2019/0318277 A1 | 10/2019 | Goldman et al. |
| 2019/0332114 A1 | 10/2019 | Moroniti et al. |
| 2020/0039427 A1 | 2/2020 | Chen et al. |
| 2020/0109954 A1 | 4/2020 | Li et al. |
| 2020/0117198 A1 | 4/2020 | Whitman et al. |
| 2020/0117214 A1 | 4/2020 | Jonak et al. |
| 2020/0164521 A1 | 5/2020 | Li |
| 2020/0174460 A1 | 6/2020 | Byrne et al. |
| 2020/0192388 A1 | 6/2020 | Zhang et al. |
| 2020/0198140 A1 | 6/2020 | Dupuis et al. |
| 2020/0216061 A1 | 7/2020 | Zidek |
| 2020/0249033 A1 | 8/2020 | Gelhar |
| 2020/0258400 A1 | 8/2020 | Yuan et al. |
| 2020/0333790 A1 | 10/2020 | Kobayashi et al. |
| 2020/0386882 A1 | 12/2020 | Klein et al. |
| 2020/0409382 A1 | 12/2020 | Herman et al. |
| 2021/0041243 A1 | 2/2021 | Fay et al. |
| 2021/0041887 A1 | 2/2021 | Whitman et al. |
| 2021/0064055 A1 | 3/2021 | Jun |
| 2021/0141389 A1 | 5/2021 | Jonak et al. |
| 2021/0180961 A1 | 6/2021 | Oh |
| 2021/0200219 A1 | 7/2021 | Gaschler |
| 2021/0311480 A1 | 10/2021 | Yang et al. |
| 2021/0323618 A1 | 10/2021 | Komoroski |
| 2021/0382491 A1 | 12/2021 | Murotani et al. |
| 2022/0024034 A1 | 1/2022 | Wei et al. |
| 2022/0063662 A1 | 3/2022 | Sprunk et al. |
| 2022/0083062 A1 | 3/2022 | Jaquez et al. |
| 2022/0088776 A1 | 3/2022 | Kuffner |
| 2022/0137637 A1 | 5/2022 | Baldini et al. |
| 2022/0155078 A1 | 5/2022 | Fay et al. |
| 2022/0179420 A1 | 6/2022 | Whitman et al. |
| 2022/0244741 A1 | 8/2022 | Silva et al. |
| 2022/0276654 A1 | 9/2022 | Lee et al. |
| 2022/0342421 A1 | 10/2022 | Kearns |
| 2022/0374024 A1 | 11/2022 | Whitman et al. |
| 2022/0388170 A1 | 12/2022 | Merewether |
| 2022/0390950 A1 | 12/2022 | Yamauchi |
| 2022/0390954 A1 | 12/2022 | Klingensmith |
| 2023/0062175 A1 | 3/2023 | Yahata |
| 2023/0273621 A1 | 8/2023 | Okamori et al. |
| 2023/0309776 A1 | 10/2023 | Li et al. |
| 2023/0359220 A1 | 11/2023 | Jonak et al. |
| 2023/0418297 A1 | 12/2023 | Komoroski et al. |
| 2024/0061436 A1 | 2/2024 | Tsuzaki et al. |
| 2024/0165821 A1 | 5/2024 | Dabiri et al. |
| 2024/0361779 A1 | 10/2024 | Dellon et al. |

FOREIGN PATENT DOCUMENTS

| | | |
|---|---|---|
| CN | 203371557 | 1/2014 |
| CN | 103869820 A | 6/2014 |
| CN | 104075715 A | 10/2014 |
| CN | 104470685 A | 3/2015 |
| CN | 104536445 A | 4/2015 |
| CN | 106200633 A | 12/2016 |
| CN | 106371445 A | 2/2017 |

(56) References Cited

FOREIGN PATENT DOCUMENTS

| | | |
|---|---|---|
| CN | 107301654 A | 10/2017 |
| CN | 107943038 A | 4/2018 |
| CN | 108052103 | 5/2018 |
| CN | 108292473 A | 7/2018 |
| CN | 108801269 A | 11/2018 |
| CN | 109029417 A | 12/2018 |
| CN | 109540142 A | 3/2019 |
| CN | 111604916 | 9/2020 |
| CN | 211956515 | 11/2020 |
| CN | 112034861 | 12/2020 |
| CN | 113168184 | 7/2021 |
| CN | 113633219 | 11/2021 |
| CN | 114174766 | 3/2022 |
| CN | 114503043 | 5/2022 |
| DE | 102016206209 A1 | 10/2017 |
| JP | H 02127180 A | 5/1990 |
| JP | H09-134217 | 11/2003 |
| JP | 2005-088189 | 4/2005 |
| JP | 2006-011880 | 1/2006 |
| JP | 2006-239844 | 9/2006 |
| JP | 2007-041656 | 2/2007 |
| JP | 2008-072963 | 4/2008 |
| JP | 2009-223628 | 10/2009 |
| JP | 2009-271513 | 11/2009 |
| JP | 2010-253585 | 11/2010 |
| JP | 2013-250795 | 12/2013 |
| JP | 2014-123200 | 7/2014 |
| JP | 2014-151370 | 8/2014 |
| JP | 2016-081404 | 5/2016 |
| JP | 2016-103158 | 6/2016 |
| JP | 2017-182502 | 10/2017 |
| JP | 2019-500691 | 1/2019 |
| JP | 2019500691 A | 1/2019 |
| JP | 2019-021197 | 2/2019 |
| JP | 2022-504039 | 1/2022 |
| JP | 2022-543997 | 10/2022 |
| JP | 7219812 | 2/2023 |
| JP | 7259020 | 4/2023 |
| KR | 10-1121763 | 3/2012 |
| KR | 20120019893 | 3/2012 |
| KR | 20130020107 A | 2/2013 |
| KR | 20220078563 A | 6/2022 |
| KR | 20220083666 | 6/2022 |
| KR | 10-2504729 | 2/2023 |
| KR | 10-2023-0035139 | 3/2023 |
| KR | 10-2533690 | 5/2023 |
| KR | 10-2492242 | 6/2023 |
| WO | WO 2007/051972 | 5/2007 |
| WO | WO 2017/090108 | 6/2017 |
| WO | WO 2018/231616 | 12/2018 |
| WO | WO 2020/076418 | 4/2020 |
| WO | WO 2020/076422 | 4/2020 |
| WO | WO 2021/025707 | 2/2021 |
| WO | WO 2021/025708 | 2/2021 |
| WO | WO 2022/164832 | 8/2022 |
| WO | WO 2022/256811 | 12/2022 |
| WO | WO 2022/256815 | 12/2022 |
| WO | WO 2022/256821 | 12/2022 |
| WO | WO 2023/249979 A1 | 12/2023 |
| WO | WO 2024/220811 A2 | 10/2024 |

OTHER PUBLICATIONS

Song et al., "Environment model based path planning for mobile robot", Electronics Optics & Control, Jun. 30, 2006, 3: 102-104.
Wei et al., "A method of autonomous robot navigation in dynamic unknown environment", J Comp Res Devel. Sep. 30, 2005; 9: 1538-1543.
Zhao et al., "Machine vision-based unstructured road navigation path detection method", Trans Chinese Soc Agricult Mach. Jun. 25, 2007; 6: 202-204. (English Abstract not available).
Chinese Office Action for Application No. 201980098897.7 dated May 17, 2024, 27 Pages.
Korean Office Action for Application No. 10-2022-7007114 dated Aug. 30, 2024, 10 Pages.
International Search Report and Written Opinion for PCT Application No. PCT/US2023/025806, Oct. 11, 2023, 16 pages.
Abraham et al., "A Topological Approach of Path Planning for Autonomous Robot Navigation in Dynamic Environments", The 2009 IEEE/RSJ International Conference on Intelligent Robots and Systems, Oct. 11-15, 2009.
Alkautsar, "Topological Path Planning and Metric Path Planning", https://medium.com/@arifmaulanaa/topological-path-planning-and-metric-path-planning-5c0fa7f107f2, downloaded Feb. 13, 2023, 3 pages.
Boost.org, "buffer (with strategies)", https://www.boost.org/doc/libs/1_75_0/libs/geometry/doc/html/geometry/reference/algorithms/buffer/buffer_7_with_strategies.html, downloaded Feb. 1, 2023, 5 pages.
Buchegger et al. "An Autonomous Vehicle for Parcel Delivery in Urban Areas" International Conference on Intelligent Transporation Systems (ITSC) Nov. 2018.
Cao, "Topological Path Planning for Crowd Navigation", https://www.ri.cmu.edu/app/uploads/2019/05/thesis.pdf, May 2019, 24 pages.
Collins et al. "Efficient Planning for High-Speed MAV Flight in Unknown Environments Using Online Sparse Topological Graphs" IEEE International Conference on Robotics and Automation (ICRA) Aug. 2020.
Github.com, "cartographer-project/cartographer", https://github.com/cartographer-project/cartographer, downloaded Feb. 1, 2023, 4 pages.
International Search Report and Written Opinion for PCT Application No. PCT/US2019/047804, Apr. 6, 2020, 14 pages.
International Search Report and Written Opinion for PCT Application No. PCT/US2019/051092, Apr. 30, 2020, 12 pages.
International Search Report and Written Opinion for PCT Application No. PCT/US2022/072710, Sep. 27, 2022, 16 pages.
International Search Report and Written Opinion for PCT Application No. PCT/US2022/072703, Sep. 22, 2022, 13 pages.
International Search Report and Written Opinion for PCT Application No. PCT/US2022/072717, Sep. 30, 2022, 26 pages.
Kuipers et al. "A Robot Exploration and Mapping Strategy Based on a Semantic Hierarchy of Spatial Representations" Journal of Robotics & Autonomous Systems vol. 8, 1991, pp. 47-63.
Leon et al., "TIGRE: Topological Graph based Robotic Exploration", 2017 European Conference on Mobile Robots (ECMR), Paris, France, 2017, pp. 1-6, doi: 10.1109/ECMR.2017.8098718.
McCammon et al., "Topological path planning for autonomous information gathering", Auton Robot 45, 821-842 (2021). https://doi.org/10.1007/s10514-021-10012-x.
Mendes et al., "ICP-based pose-graph SLAM", International Symposium on Safety, Security and Rescue Robotics (SSRR), Oct. 2016, Lausanne, Switzerland. pp. 195-200, ff10.1109/SSRR.2016.7784298, hal-01522248.
Poncela et al., "Efficient integration of metric and topological maps for directed exploration of unknown environments", Robotics and Autonomous Systems, Elsevier BV, Amsterdam, NL, vol. 41, No. 1, Oct. 31, 2002 (Oct. 31, 2002), p. 21-39.
Tang, "Introduction to Robotics", The Wayback Machine, https://web.archive.org/web/20160520085742/http://www.cpp.edu:80/~ftang/courses/CS521/, downloaded Feb. 3, 2023, 58 pages.
Thrun et al., "The GraphSLAM Algorithm with Applications to Large-Scale Mapping of Urban Structures", The International Journal of Robotics Research, vol. 25, No. 5-6, May-Jun. 2006, pp. 403-429.
Video game, "Unreal Engine 5", https://docs.unrealengine.com/5.0/en-US/basic-navigation-in-unreal-engine/, downloaded Feb. 1, 2023, 15 pages.
Whelan et al., "ElasticFusion: Dense SLAM Without a Pose Graph", http://www.roboticsproceedings.org/rss11/p01.pdf, downloaded Feb. 1, 2023, 9 pages.
Wikipedia.org, "Buffer (GIS)", http://wiki.gis.com/wiki/index.php/Buffer_(GIS)#:~:text=A%20'polygon%20buffer'%20is%20a,Buffer%20around%20line%20features, downloaded Feb. 1, 2023, 4 pages.
Wikipedia.org, "Probabilistic roadmap", https://en.wikipedia.org/wiki/Probabilistic_roadmap, downloaded Feb. 1, 2023, 2 pages.

(56) References Cited

OTHER PUBLICATIONS

Wikipedia.org, "Rapidly-exploring random tree", https://en.wikipedia.org/wiki/Rapidly-exploring_random_tree, downloaded Feb. 1, 2023, 7 pages.
Wikipedia.org, "Visibility graph", https://en.wikipedia.org/wiki/Visibility_graph, downloaded Feb. 1, 2023, 3 pages.
Yamauchi et al. "Place Recognition in Dynamic Environments" Journal of Robotic Systems, Special Issue on Mobile Robots, vol. 14, No. 2, Feb. 1997, pp. 107-120.
Yamauchi et al. "Spatial Learning for Navigation in Dynamic Environments" IEEE Transactions on Systems, Man, and Cybernetics—Part B: Cybernetics, Special Issue on Learning Autonomous Robots, vol. 26, No. 3, Jun. 1996, pp. 496-505.
Boston Dynamics, "Hey Buddy, Can You Give Me a Hand?" https://www.youtube.com/watch?v=fUyU3IKzoio, Feb. 12, 2018, downloaded Jul. 31, 2023.
Boston Dynamics, "Introducing Spot Classic (previously Spot)," https://www.youtube.com/watch?v=M8YjvHYbZ9w, Feb. 9, 2015, downloaded Aug. 10, 2023.
Boston Dynamics, "Introducing Spot (Previously SpotMini)," https://www.youtube.com/watch?v=tf7IEVTDjng, Jun. 23, 2016, downloaded Jul. 31, 2023.
Boston Dynamics, "Spot Autonomous Navigation," https://www.youtube.com/watch?v=Ve9kWX_KXus, May 10, 2018, downloaded Sep. 5, 2023.
Boston Dynamics, "Spot Robot Testing at Construction Sites," https://www.youtube.com/watch?v=wND9goxDVrY&t=15s, Oct. 11, 2018, downloaded Sep. 5, 2023.
Boston Dynamics, "SpotMini", The Wayback Machine, http://web.archive.org/web/20171118145237/https://bostondynamics.com/spot-mini, downloaded Jul. 31, 2023, 3 pages.
Boston Dynamics, "Testing Robustness," https://www.youtube.com/watch?v=aFuA50H9uek, Feb. 20, 2018, downloaded Jul. 31, 2023.
Boston Dynamics, "The New Spot," https://www.youtube.com/watch?v=kgaO45SyaO4, Nov. 13, 2017, downloaded Jul. 31, 2023.
Office Action received in Japanese Application No. 2022-502242 dated Mar. 10, 2023.
Office Action received in Korean Application No. 10-2022-7007114 dated Apr. 20, 2022.
Office Action received in Japanese Application No. JP 2022-502242, dated Aug. 23, 2023, 9 pages.
International Search Report and Written Opinion for PCT Application No. PCT/US2022/013777, May 6, 2022, 11 pages.
International Search Report and Written Opinion for PCT Application No. PCT/US2019/046646 Oct. 31, 2019, 9 pages.
International Search Report and Written Opinion for PCT Application No. PCT/US2019/051511, Jul. 1, 2020, 15 pages.
Lee et al. "A New Semantic Descriptor for Data Association in Semantic SLAM", 2019 109th International Conference on Control, Automation and Systems (ICCAS), Jeju, Korea (South), 2019, pp. 1178-1181, doi: 10.23919/ICCAS47443.2019.8971639.
Matsumaru T., Mobile robot with preliminary-announcement and display function of forthcoming motion using projection equipment. In Roman 2006—The 15th IEEE International Symposium on Robot and Human Interactive Communication Sep. 6, 2006 (pp. 443-450).
Wengefeld et al., "A laser projection system for robot intention communication and human robot interaction." In 2020 29th IEEE International Conference on Robot and Human Interactive Communication (RO-MAN) Aug. 31, 2020 (pp. 259-265).
European Office Action for Application No. 19779280.7, Oct. 23, 2024, 7 pages.
International Search Report and Written Opinion for PCT Application No. PCT/US2024/025417, Nov. 5, 2024, 26 pages.
Chinese Office Action for Application No. 201980098897.7 dated Oct. 11, 2024, 7 pages.

\* cited by examiner

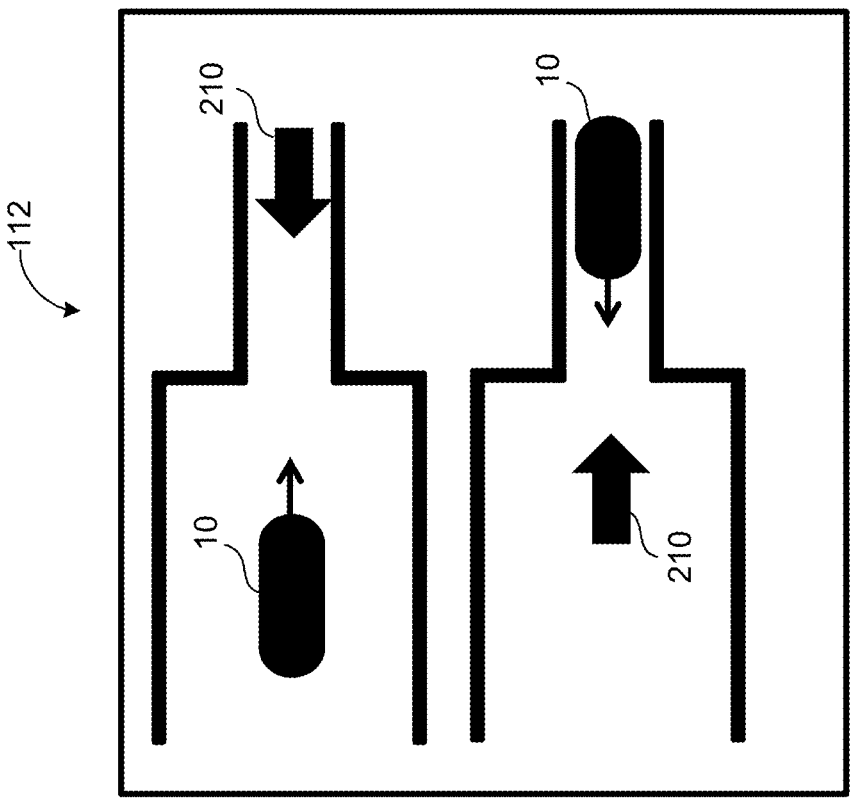
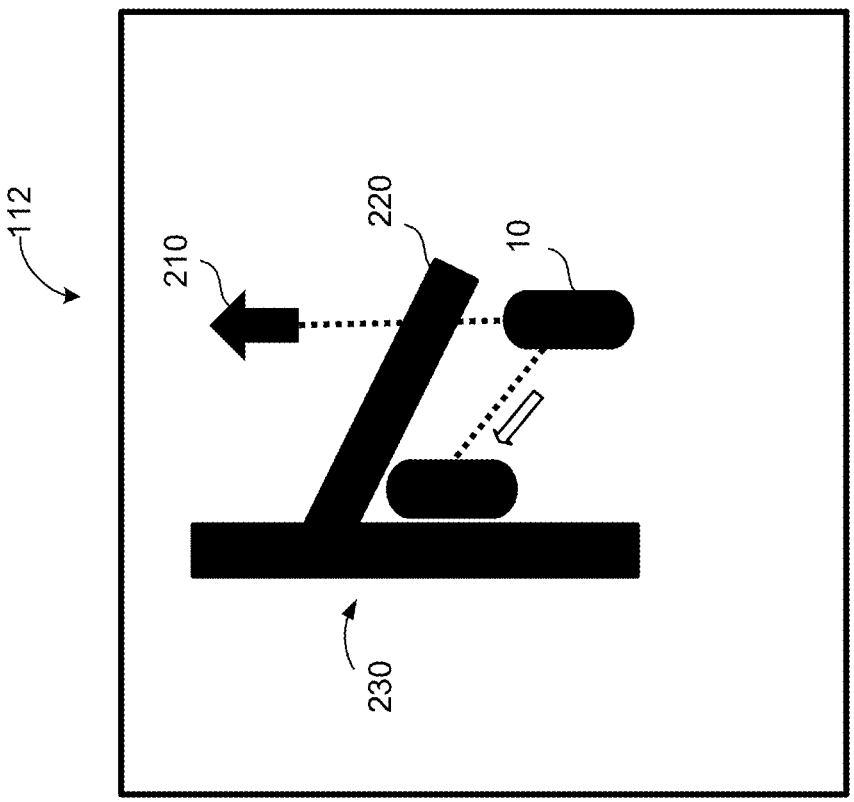

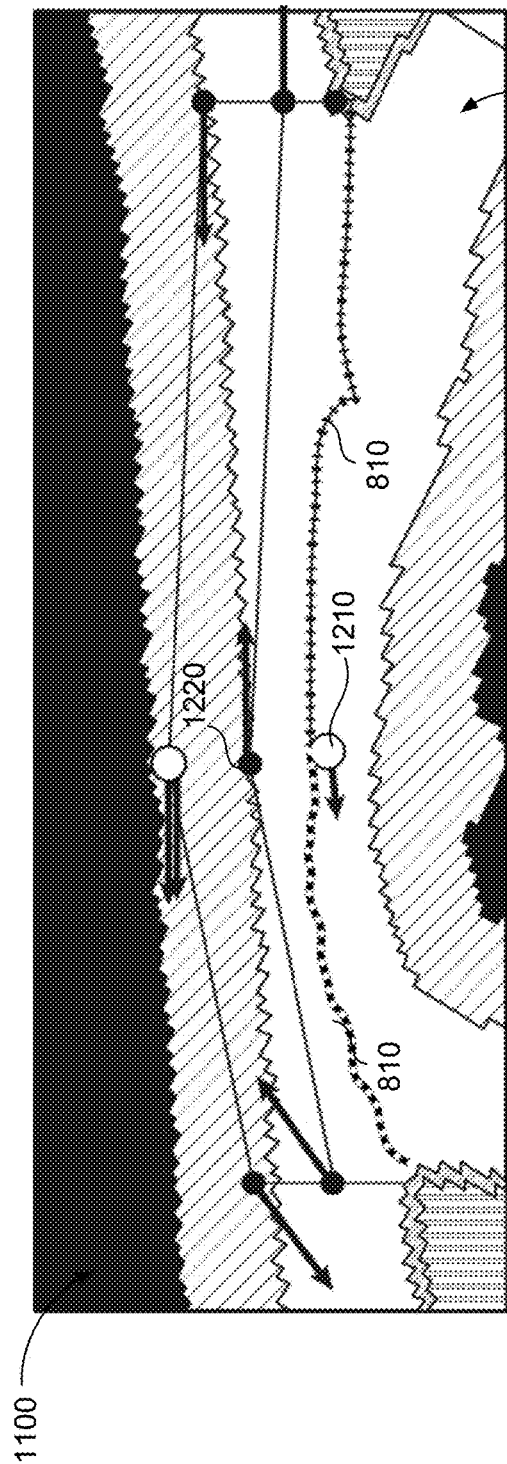
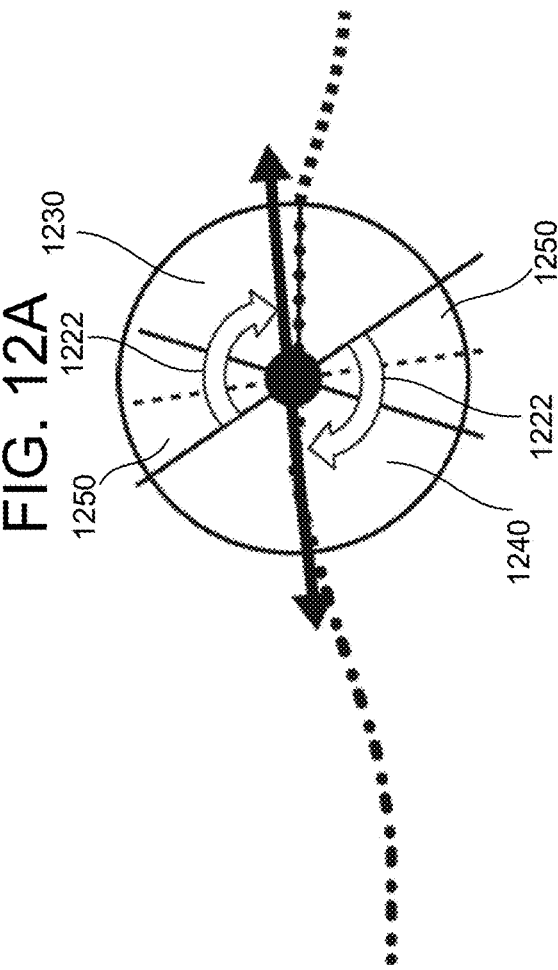
FIG. 12A
FIG. 12B

INTERMEDIATE WAYPOINT GENERATOR

CROSS REFERENCE TO RELATED APPLICATION

This U.S. patent application is a continuation of, and claims priority under 35 U.S.C. § 120 from, U.S. patent application Ser. No. 17/649,620, filed on Feb. 1, 2022, which is a continuation of U.S. patent application Ser. No. 16/569,885, filed on Sep. 13, 2019, which claims priority under 35 U.S.C. § 119(e) to U.S. Provisional Application 62/883,438, filed on Aug. 6, 2019, each of which is considered part of the disclosure of this application and is hereby incorporated by reference in its entirety.

TECHNICAL FIELD

This disclosure relates to generating intermediate waypoints in the presence of constraints, especially those imposed by terrain.

BACKGROUND

Robotic devices are increasingly being used to navigate constrained environments to perform a variety of tasks or functions. These robotic devices often need to navigate through these constrained environments without contacting the obstacles or becoming stuck or trapped. As these robotic devices become more prevalent, there is a need for real-time navigation and route planning that avoids contact with obstacles while successfully navigating to the destination.

SUMMARY

One aspect of the disclosure provides a method for generating intermediate waypoints for a navigation system of a robot. The method includes receiving, at data processing hardware of a robot, a navigation route. The navigation route includes a series of high-level waypoints that begin at a starting location and end at a destination location and are based on high-level navigation data. The high-level navigation data is representative of locations of static obstacles in an area the robot is to navigate. The method also includes receiving, at the data processing hardware, image data of an environment about the robot from an image sensor. The method also includes generating, by the data processing hardware, at least one intermediate waypoint based on the image data. The method also includes adding, by the data processing hardware, the at least one intermediate waypoint to the series of high-level waypoints of the navigation route and navigating, by the data processing hardware, the robot from the starting location along the series of high-level waypoints and the at least one intermediate waypoint toward the destination location.

Implementations of the disclosure may include one or more of the following optional features. In some implementations, each high-level waypoint and each intermediate waypoint include two coordinates indicating a position on a plane, a yaw value, and a time value. The time value indicates an estimated amount of time for the robot to navigate to the respective waypoint. In some examples, the method further includes maintaining, by the data processing hardware, each of the series of high-level waypoints on the navigation route. The method may also include receiving, at the data processing hardware, a body obstacle map. The body obstacle map includes a map of obstacles that a body of the robot cannot traverse. Additionally, generating the at least one intermediate waypoint may include generating a sparse graph based on the body obstacle map. The sparse graph includes a list of nodes and edges. The nodes and edges are representative of paths the robot may travel in the environment. The method may also include planning a coarse path from a first node from the list of nodes to a second node from the list of nodes. The first node and the second node are each representative of a space in the environment. The method may also include determining a point along the coarse path where line of sight by the image sensor is lost and generating one of the at least one intermediate waypoint at the point where line of sight is lost.

In some implementations, generating the sparse graph includes generating a full configuration space map based on the body obstacle map. The full configuration space map includes a two-dimensional grid of elements, where each element of the grid represents a space of the environment and each element of the full configuration space map includes a respective set of yaw configurations. Each yaw configuration may be classified as valid or invalid, where a valid yaw configuration represents a yaw configuration of the robot that is safe from contacting obstacles at the space associated with the respective element and an invalid yaw configuration represents a yaw configuration of the robot that is not safe from contacting obstacles at the space associated with the respective element. The method may also include generating a compressed configuration space map from the full configuration space map. The compressed configuration space map includes a second two-dimensional grid of elements and each element of the second grid represents a space of the environment. Each element of the second grid is also categorized as one of (i) a yaw collision zone, (ii) a yaw free zone, or (iii) a yaw constrained zone. The method, in some examples, includes generating the sparse graph from the compressed configuration space map.

Optionally, planning the coarse path from the first node to the second node includes generating a dense graph from the compressed configuration space map. The dense graph includes elements categorized as yaw free zone. The method may also include linking edges from the sparse graph with elements from the dense graph. Linking the edges with elements from the dense graph, in some implementations, includes combining the sparse graph and the dense graph to generate a final graph. In some examples, the method also includes executing an A* search algorithm on the final graph.

In some examples, generating the sparse graph further includes overlaying a plurality of Voronoi cells onto the compressed configuration space map, where each Voronoi cell is categorized as yaw constrained zone on the sparse graph. Each Voronoi cell is equidistant from at least two elements categorized as yaw collision zone. Optionally, generating the sparse graph further includes classifying each Voronoi cell as either an edge or a node. Classifying each Voronoi cell may include executing a flood fill algorithm.

In some implementations, planning the coarse path from the first node to the second node includes pruning edges, and each pruned edge includes elements under a threshold length and categorized as either yaw collision zone or yaw constrained zone. Determining the point along the coarse path where line of sight by the image sensor is lost may include determining a minimum allowable yaw and a maximum allowable yaw at each element along the planned coarse path and determining a smallest envelope based on the minimum allowable yaw and the maximum allowable yaw. The method may also include determining that a required yaw at a point on the coarse path is outside the smallest envelope.

In some examples, the method further includes sending, by the data processing hardware, the navigation route with the high-level waypoints and the at least one intermediate waypoint to a low-level path generator. The method may also include determining, by the data processing hardware, whether to add the at least one intermediate waypoint to the navigation route and, in response to determining not to add at the at least one intermediate waypoint to the navigation route, passing, by the data processing hardware, the navigation route unaltered to the low-level path generator.

Another aspect of the disclosure provides a robot that includes a body and legs coupled to the body and configured to maneuver the robot about an environment. The robot also includes data processing hardware in communication with the legs and memory hardware in communication with the data processing hardware. The memory hardware stores instructions that when executed on the data processing hardware cause the data processing hardware to perform operations. The operations include receiving a navigation route. The navigation route includes a series of high-level waypoints that begin at a starting location and end at a destination location and are based on high-level navigation data. The high-level navigation data is representative of locations of static obstacles in an area the robot is to navigate. The operations also include receiving image data of an environment about the robot from an image sensor. The operations also include generating at least one intermediate waypoint based on the image data. The operations also include adding the at least one intermediate waypoint to the series of high-level waypoints of the navigation route and navigating the robot from the starting location along the series of high-level waypoints and the at least one intermediate waypoint toward the destination location.

This aspect may include one or more of the following optional features. In some implementations, each high-level waypoint and each intermediate waypoint include two coordinates indicating a position on a plane, a yaw value, and a time value. The time value indicates an estimated amount of time for the robot to navigate to the respective waypoint. In some examples, the operations further include maintaining each of the series of high-level waypoints on the navigation route. The operations may also include receiving a body obstacle map. The body obstacle map includes a map of obstacles that a body of the robot cannot traverse. Additionally, generating the at least one intermediate waypoint may include generating a sparse graph based on the body obstacle map. The sparse graph includes a list of nodes and edges. The nodes and edges are representative of paths the robot may travel in the environment. The operations may also include planning a coarse path from a first node from the list of nodes to a second node from the list of nodes. The first node and the second node are each representative of a space in the environment. The operations may also include determining a point along the coarse path where line of sight by the image sensor is lost and generating one of the at least one intermediate waypoint at the point where line of sight is lost.

In some implementations, generating the sparse graph includes generating a full configuration space map based on the body obstacle map. The full configuration space map includes a two-dimensional grid of elements, where each element of the grid represents a space of the environment and each element of the full configuration space map includes a respective set of yaw configurations. Each yaw configuration may be classified as valid or invalid, where a valid yaw configuration represents a yaw configuration of the robot that is safe from contacting obstacles at the space associated with the respective element and an invalid yaw configuration represents a yaw configuration of the robot that is not safe from contacting obstacles at the space associated with the respective element. The operations may also include generating a compressed configuration space map from the full configuration space map. The compressed configuration space map includes a second two-dimensional grid of elements and each element of the second grid represents a space of the environment. Each element of the second grid is also categorized as one of (i) a yaw collision zone, (ii) a yaw free zone, or (iii) a yaw constrained zone. The operations, in some examples, include generating the sparse graph from the compressed configuration space map.

Optionally, planning the coarse path from the first node to the second node includes generating a dense graph from the compressed configuration space map. The dense graph includes elements categorized as yaw free zone. The operations may also include linking edges from the sparse graph with elements from the dense graph. Linking the edges with elements from the dense graph, in some implementations, includes combining the sparse graph and the dense graph to generate a final graph. In some examples, the operations also include executing an A* search algorithm on the final graph.

In some examples, generating the sparse graph further includes overlaying a plurality of Voronoi cells onto the compressed configuration space map, where each Voronoi cell is categorized as yaw constrained zone on the sparse graph. Each Voronoi cell is equidistant from at least two elements categorized as yaw collision zone. Optionally, generating the sparse graph further includes classifying each Voronoi cell as either an edge or a node. Classifying each Voronoi cell may include executing a flood fill algorithm.

In some implementations, planning the coarse path from the first node to the second node includes pruning edges, and each pruned edge includes elements under a threshold length and categorized as either yaw collision zone or yaw constrained zone. Determining the point along the coarse path where line of sight by the image sensor is lost may include determining a minimum allowable yaw and a maximum allowable yaw at each element along the planned coarse path and determining a smallest envelope based on the minimum allowable yaw and the maximum allowable yaw. The operations may also include determining that a required yaw at a point on the coarse path is outside the smallest envelope.

In some examples, the operations further include sending the navigation route with the high-level waypoints and the at least one intermediate waypoint to a low-level path generator. The operations may also include determining whether to add the at least one intermediate waypoint to the navigation route and, in response to determining not to add at the at least one intermediate waypoint to the navigation route, passing the navigation route unaltered to the low-level path generator.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 2A and 2B are schematic views of a robot navigating a navigation route using high-level waypoints.

FIGS. 12A and 12B are schematic views of an added node for a goal destination.

Like reference symbols in the various drawings indicate like elements.

DETAILED DESCRIPTION

As legged robotic devices (also referred to as "robots") become more prevalent, there is an increasing need for the robots to autonomously navigate environments that are constrained in a number of ways. Often, the robots rely on high-level map data that stores information relating to large and/or static objects (e.g., walls, doors, etc.). When given a destination goal, the robot will often first plot a path or course from this high-level map to navigate the static obstacles and then rely on a perception system that gathers low-level navigation data to navigate around small and dynamic objects encountered while travelling. Frequently, when navigating these sort of environments, the robot encounters an obstacle that is not accounted for in the high-level map, but is too large for the low-level system to navigate around. In these situations, it is not uncommon for the robot to become stuck or trapped. Implementations herein are directed toward systems and methods for an intermediate waypoint generator for generating intermediate waypoints to a high-level route in real-time, thus allowing a legged robotic device to efficiently navigate around larger dynamic objects.

Figure 1:
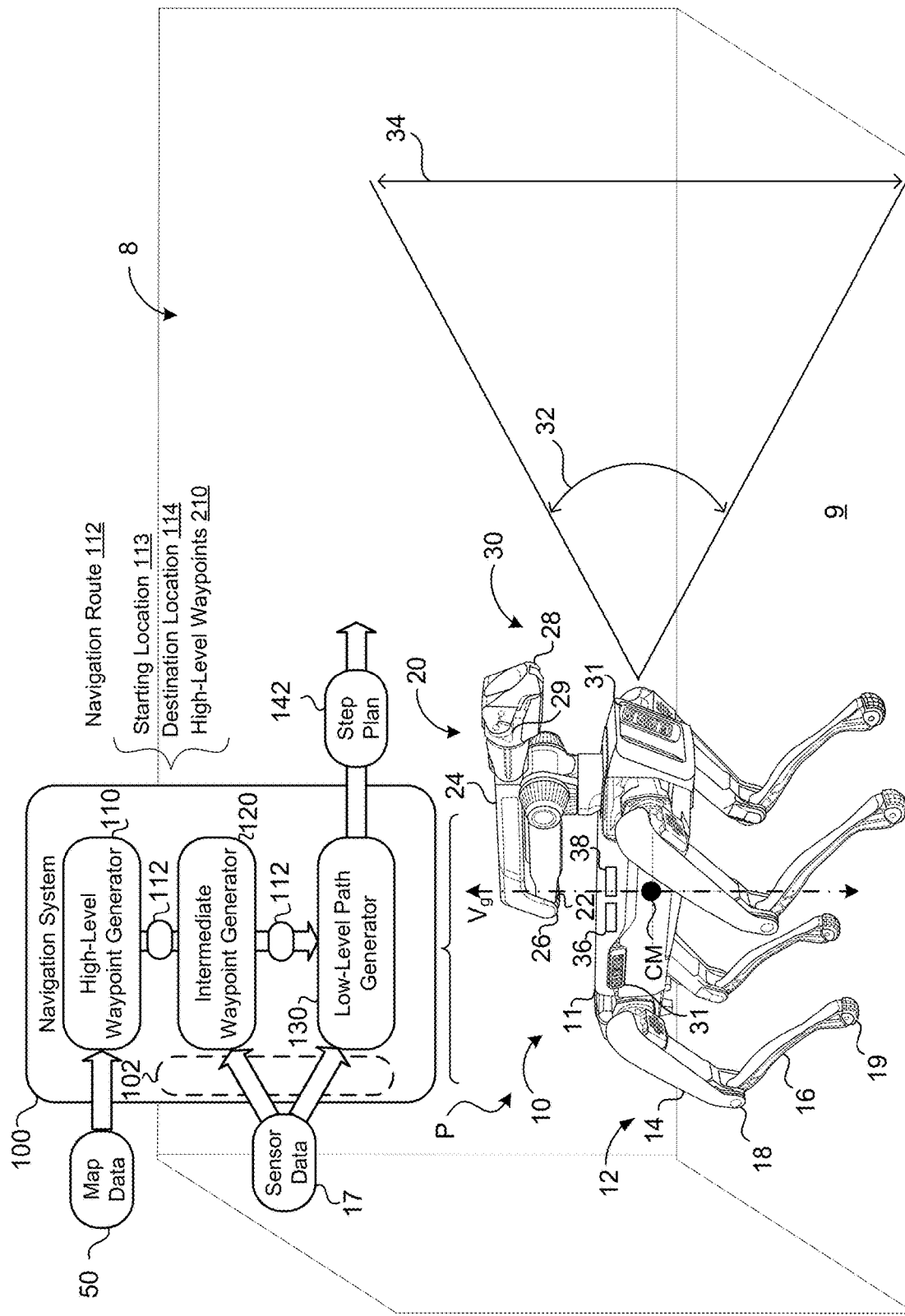
FIG. 1 is a schematic view of an example system for a navigation system that generates intermediate waypoints for a robot.

Referring to FIG. 1, a robot or robotic device 10 includes a body 11 with two or more legs 12 and executes a navigation system 100 for enabling the robot 10 to navigate a constrained environment 8. Each leg 12 is coupled to the body 11 and may have an upper portion 14 and a lower portion 16 separated by a leg joint 18. The lower portion 16 of each leg 12 ends in a foot 19. The foot 19 of each leg is optional and the terminal end of the lower portion of one or more of the leg 12 may be coupled to a wheel or the distal end of each leg 12 may directly contact the a ground surface 9. The robot 10 has a vertical gravitational axis Vg along a direction of gravity, and a center of mass CM, which is a point where the weighted relative position of the distributed mass of the robot 10 sums to zero. The robot 10 further has a pose P based on the CM relative to the vertical gravitational axis Vg (i.e., the fixed reference frame with respect to gravity) to define a particular attitude or stance assumed by the robot 10. The attitude of the robot 10 can be defined by an orientation or an angular position of the robot 10 in space. Movement by the legs 12 relative to the body 11 alters the pose P of the robot 10 (i.e., the combination of the position of the CM of the robot and the attitude or orientation of the robot 10).

In some implementations, the robot 10 further includes one or more appendages, such as an articulated arm 20 disposed on the body 11 and configured to move relative to the body 11. The articulated arm 20 may have five-degrees or more of freedom. Moreover, the articulated arm 20 may be interchangeably referred to as a manipulator arm or simply an appendage. In the example shown, the articulated arm 20 includes two portions 22, 24 rotatable relative to one another and also the body 11; however, the articulated arm 20 may include more or less portions without departing from the scope of the present disclosure. The first portion 22 may be separated from second portion 24 by an articulated arm joint 26. An end effector 28, which may be interchangeably referred to as a manipulator head 28, may be coupled to a distal end of the second portion 24 of the articulated arm 20 and may include one or more actuators 29 for gripping/grasping objects.

The robot 10 also includes a vision system 30 with at least one imaging sensor or camera 31, each sensor or camera 31 capturing image data or sensor data 17 of the environment 8 surrounding the robot 10 with an angle of view 32 and within a field of view 34. The vision system 30 may be configured to move the field of view 34 by adjusting the angle of view 32 or by panning and/or tilting (either independently or via the robot 10) the camera 31 to move the field of view 34 in any direction. Alternatively, the vision system 30 may include multiple sensors or cameras 31 such that the vision system 30 captures a generally 360-degree field of view around the robot 10.

The camera(s) 31 of the vision system 30, in some implementations, include one or more stereo cameras (e.g., one or more RGBD stereo cameras). In other examples, the vision system 30 includes one or more radar sensors such as a scanning light-detection and ranging (LIDAR) sensor, or a scanning laser-detection and ranging (LADAR) sensor, a light scanner, a time-of-flight sensor, or any other three-dimensional (3D) volumetric image sensor (or any such combination of sensors). In some implementations, the navigation system 100 includes a perception system 102 that receives and processes the sensor data 17 and passes the processed sensor data 17 to the intermediate waypoint generator 120 and low-level path generator 130.

The vision system 30 provides image data or sensor data 17 derived from image data captured by the cameras or sensors 31 to data processing hardware 36 of the robot 10. The data processing hardware 36 is in digital communication with memory hardware 38 and, in some implementations, may be a remote system. The remote system may be a single computer, multiple computers, or a distributed system (e.g., a cloud environment) having scalable/elastic computing resources and/or storage resources. A navigation system 100 of the robot 10 executes on the data processing hardware 36.

In the example shown, the navigation system 100 includes a high-level waypoint generator 110 that receives map data 50 (i.e., high-level navigation data representative of locations of static obstacles in an area the robot 10 is to navigate) and generates one or more high-level waypoints 210 (FIGS. 2A and 2B) for a navigation route 112 that plot a coarse path around large and/or static obstacles from a current location of the robot 10 to a goal destination. For example, the high-level waypoint generator 110 may produce the coarse path over a greater than 10 meter scale (e.g., distances greater than 10 meters from the robot 10). The navigation system 100 also includes an intermediate waypoint generator 120 that receives the navigation route 112 and the image or sensor data 17 from the vision system 30 and includes an intermediate waypoint generator 120. Based on sensor data 17, the intermediate waypoint generator 120 may add one or more intermediate waypoints 310 (FIG. 3) to the high-level waypoints 210 (FIGS. 2A, 2B, and 3) of the navigation route 112 that form the coarse path or trajectory for the robot 10 to travel. The high-level waypoints 210 and any added intermediate waypoints 310 of the navigation route 112 are passed to a low-level path generator 130 that, combined with the sensor data 17, generates a step plan 142 that plots each individual step of the robot 10 to navigate from the current location of the robot 10 to the next waypoint 210, 310. Using the step plan 142, the robot 10 maneuvers through the environment 8 by following the step plan 142 by placing the feet 19 or distal ends of the leg 12 on the ground surface 9 at the locations indicated by the step plan 142. In some implementations, the low-level path generator 130 provides lower level obstacle avoidance by using a potential field method to avoid obstacles on an approximate four meter scale. The potential field method may "push" the robot 10 away from obstacles by integrating a sum of a velocity toward a goal and an obstacle avoidance velocity.

In some implementations, at least a portion of the navigation system 100 executes on a remote device in communication with the robot 10. For instance, the high-level waypoint generator 110 may execute on a remote device to generate one or more of the high-level waypoints 210 and the intermediate waypoint generator 120 executing on the robot 10 may receive the high-level waypoints 210 from the remote device. Optionally, the entire navigation system 100 may execute on a remote device and the remote device may control/instruct the robot 10 to maneuver the environment 8 based the step plan 142.

Referring now to FIGS. 2A and 2B, the low-level path generator 130 (using, for example, the potential field method) may encounter issues when navigating obstacles of certain shape and/or convexity. For example, the low-level path generator 130, while attempting to navigate to the high-level waypoint 210 of a corresponding navigation route 112, may slide down an obstacle or surface 220 and get stuck in a local minimum 230 (FIG. 2A). In another example, the low-level path generator 130 may lack the necessary context or decision-making ability regarding turning the robot 10. That is, the low-level path generator 130 may struggle to differentiate when to "turn then drive" versus "drive then turn" (FIG. 2B).

Figure 3:
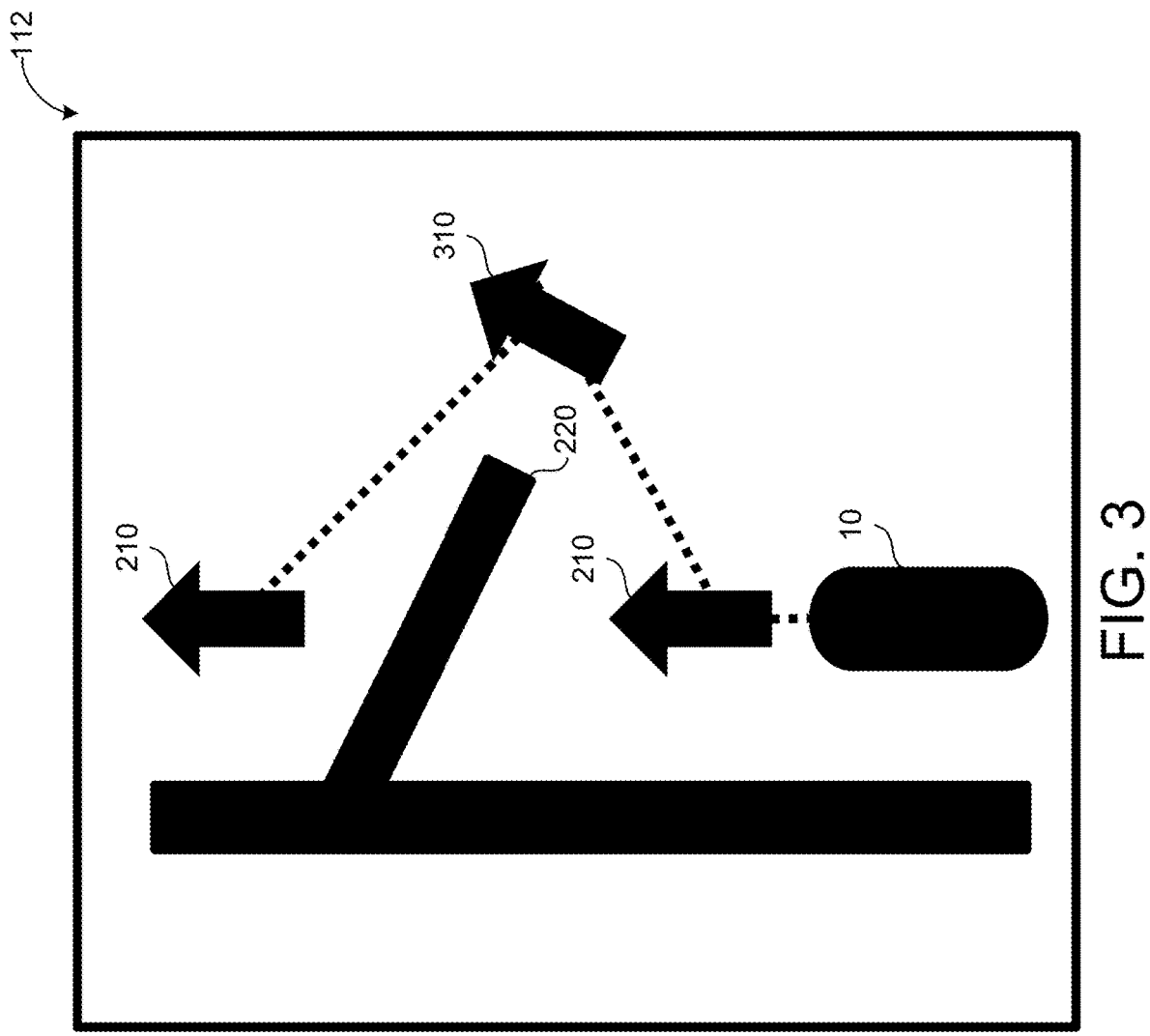
FIG. 3 is a schematic view of the robot navigating the navigation route of FIGS. 2A and 2B using high-level waypoints and an intermediate waypoint.

Referring now to FIG. 3, adding an additional waypoint (i.e., an intermediate waypoint 310) to the navigation route 112 aids the low-level path generator 130 in making proper topological decisions as the additional waypoint(s) 310 may make the trajectory appear convex to the low-level path generator 130 and allow the low-level path generator to successfully navigate around the obstacle 220. The intermediate waypoint generator 120 may ensure any added intermediate waypoints 310 added to the navigation route 112 are of sufficient distance from the robot 10 to minimize the effect of map jitter. Furthermore, the intermediate waypoint generator 120 may refrain from removing or deleting any high-level waypoints 210 as the high-level waypoint generator 110 may be privy to additional map context unavailable to the intermediate waypoint generator 120 and removing a high-level waypoint 210 may yield unpredictable results.

Figure 4:
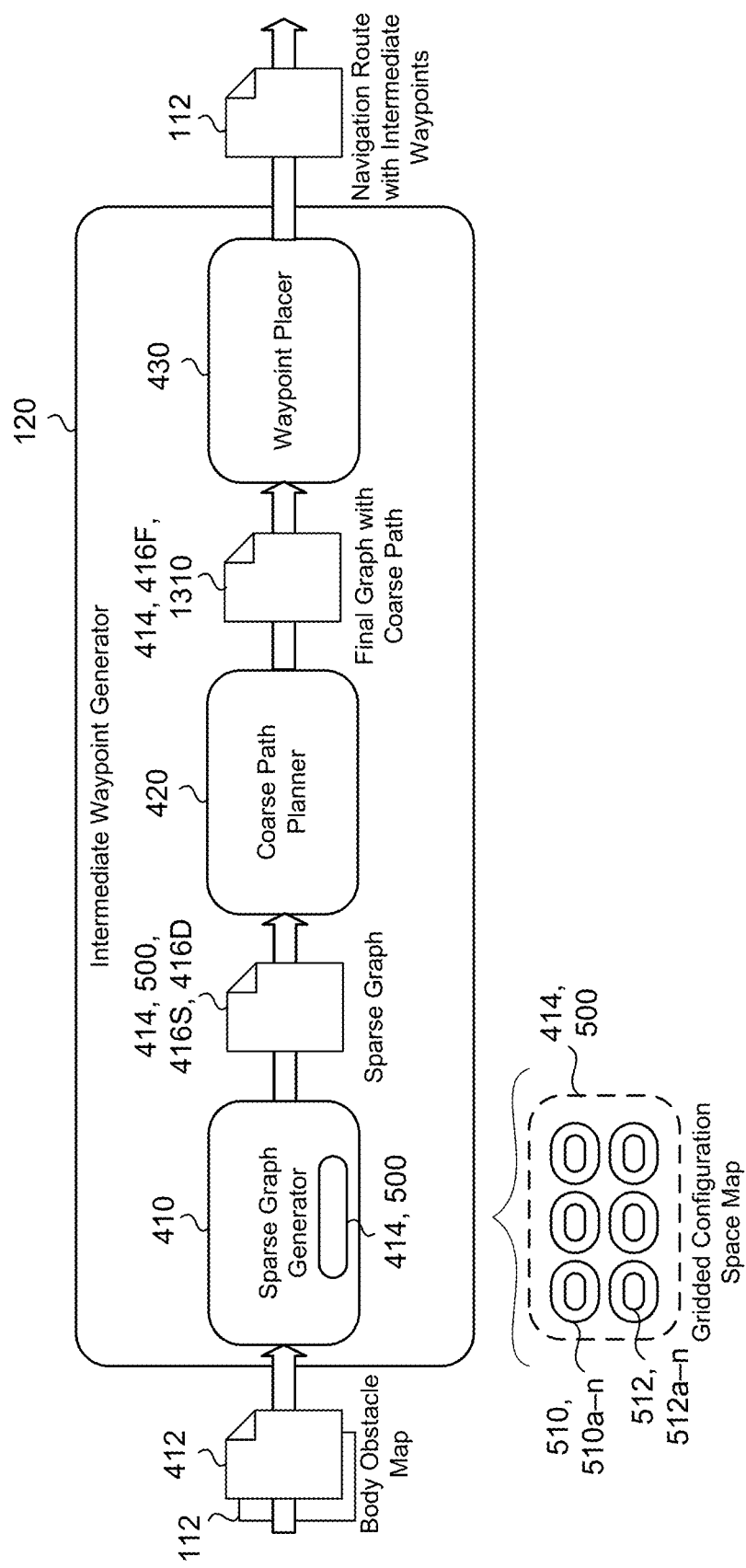
FIG. 4 is a schematic view of an example intermediate waypoint generator of the navigation system of FIG. 1.

Referring now to FIG. 4, in some implementations, the intermediate waypoint generator 120 includes a sparse graph generator 410, a coarse path planner 420, and a waypoint placer 430. The sparse graph generator 410 receives a body obstacle map 412 from, for example, the perception system 102. The body obstacle map 412 is a map of obstacles (e.g., obstacles that the body 11 of the robot 10 cannot traverse) in the immediate vicinity of the robot 10 (e.g., within four meters). From the body obstacle map 412, the sparse graph generator 410 generates a sparse graph 416S. As discussed in more detail below, the sparse graph 416S provides a list of valid interconnections between nodes 812 (FIGS. 8A-8E) and edges 810 (FIGS. 8A-8E). The nodes 812 and edges 810 represent valid potential paths through yaw restricted zones (i.e., areas of difficult or tight maneuvering) near the robot 10 and thus the sparse graph 416S provides a the information necessary to determine potential paths for the robot 10 through the yaw restricted zones.

The sparse graph generator 410 passes the sparse graph 416S to the coarse path planner 420. The coarse path planner 420 plots a coarse path 1310 (FIG. 13) using the sparse graph 416S from a starting location to a goal destination. In some examples, the coarse path planner 420 plots the coarse path 1310 by using a search algorithm (e.g., A*) to determine the most optimal route of the valid potential paths indicated by the sparse graph 416S (i.e., the list of interconnections between nodes 812 and edges 810). The coarse path planner 420 may pass the path 1310 to the waypoint placer 430. The waypoint placer 430 determines, from the current location of the robot 10, where line-of-sight is lost when following the path 1310 and places an intermediate waypoint 310 at that location. That is, the waypoint placer 430 determines the location, if the robot 10 looks along the coarse path 1310 from the current location, where the robot 10 would lose line-of-sight of the path (e.g., because of an obstacle) and places the intermediate waypoint 310 at the location on the path 1310 where line-of-sight was lost. The intermediate waypoint 310 will guide the robot 10 to a location where the low-level path generator 130 can successfully navigate the obstacle. The intermediate waypoint(s) 310 are included with the navigation route 112 and passed to the low-level path generator 130.

In some implementations, the sparse graph generator 410 initially generates a full configuration space map 414 based on the received body obstacle map 412. In some examples, the full configuration space map 414 includes a two-dimensional (2D) grid or array of elements 510, 510a—n, where each element 510 represents an area of the environment 8 (e.g., a three centimeter by three centimeter square) that indicates whether or not an obstacle prevents the robot 10 from entering the particular element 510. Optionally, the full configuration space map 414 is an array of 128 elements by 128 elements. In some examples, each element 510 may be associated with a number of respective yaw configurations 512, 512a—n (respective set of yaw configuration 512, 512a—n) and the full configuration space map 414 may indicate a status for each of the respective yaw configurations 512 for each element 510. For example, each element 510 may be associated with 64 respective yaw configurations. In this example, each yaw configuration would be rotated 5.625-degrees from the previous configuration, as 360-degrees (i.e., a full circle) divided by 64 (i.e., the number of yaw configurations) is equal to 5.625 degrees. The full configuration space map 414 may indicate, for each respective yaw configuration 512 associated with a respective element 510, whether or not the respective yaw configuration 512 will result in a collision with a body obstacle if a select point of the robot occupies the space represented by the element 510. That is, the full configuration space map 414 may indicate if each yaw configuration 512 is valid (i.e., the robot 10, in that yaw configuration 512 would not collide with an obstacle) or is invalid (i.e., the robot 10, in that yaw configuration 512, would collide with an obstacle). The select point may, for example, include a center point of the body 11 of the robot 10 (e.g., equidistance from the top of each leg 12).

Figure 5:
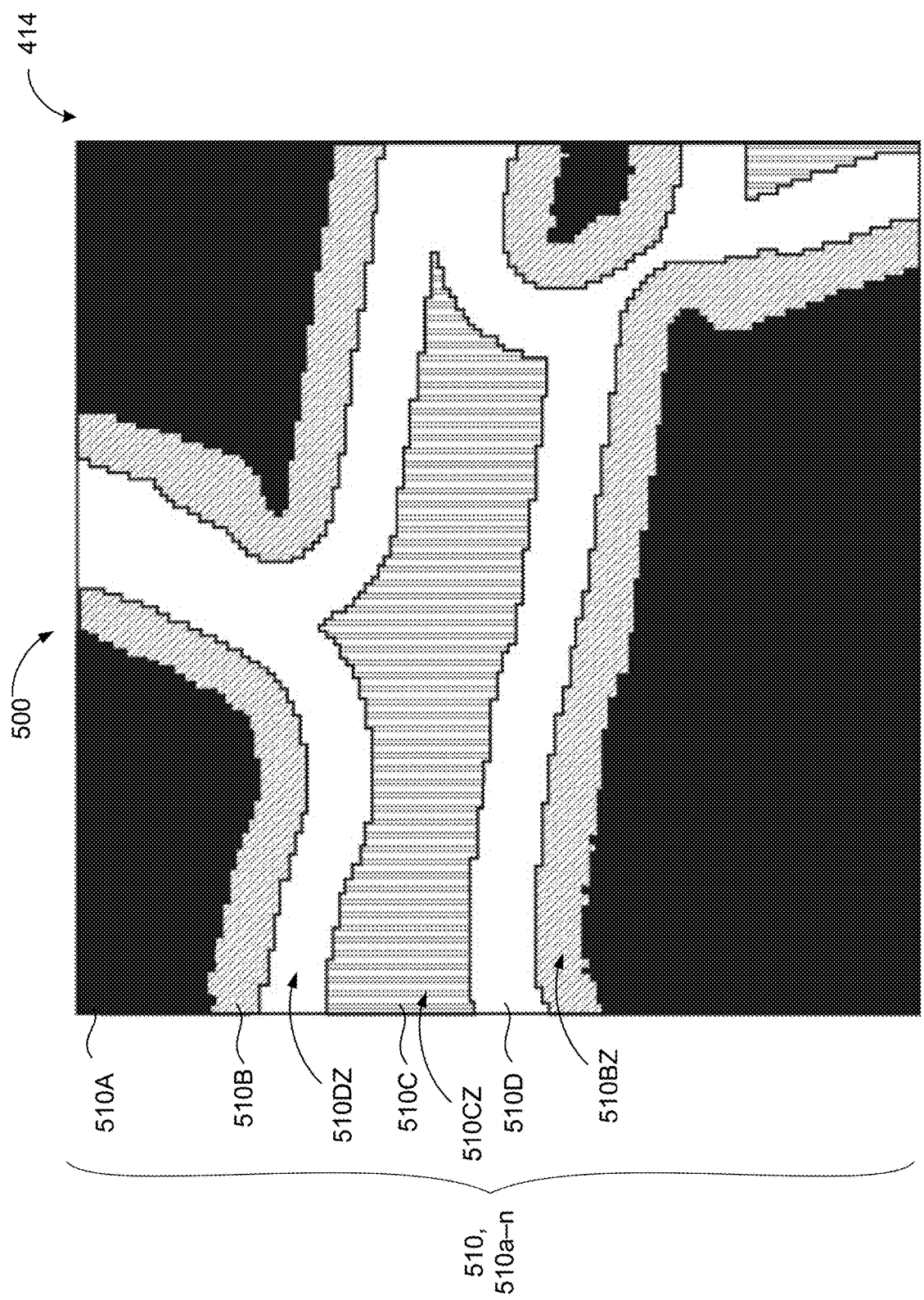
FIG. 5 is a schematic view of a compressed configuration space map.

In some implementations, the sparse graph generator 410 generates a compressed configuration space map 500 from the full configuration space map 414. The compressed configuration space map 500 may categorize each element 510 of the configuration space map 500 instead of associating each element with a number of yaw configurations 512. For example, each element 510 may be categorized as a body obstacle element 510A (FIG. 5), a yaw collision element 510B (FIG. 5), a yaw free element 510C (FIG. 5), or a yaw constrained element 510D (FIG. 5). That is, the yaw configurations 512 from the full configuration space map 414 may be used to categorize each element 510 of the compressed configuration space map 500.

Referring now to FIG. 5, an exemplary compressed configuration space map 500 is illustrated. In this example, the compressed configuration space map 500 includes a grid of 128 by 128 elements 510, each categorized as a body obstacle element 510, a yaw collision element 510B, a yaw free element 510 C, or a yaw constrained element 510D. The body obstacle elements 510A represent elements occupied by an obstacle that the robot cannot traverse (i.e., the obstacles received from the body obstacle map 412). For example, a chair, box, or a wall that the robot 10 must avoid may be categorized as a body obstacle element 510A. Yaw collision elements 510B are elements where all yaw configurations 512 for the robot 10 (e.g., all 64 yaw configurations) result in a collision with a body obstacle (i.e., a body obstacle element 510A) when the select point (e.g., the center of the body 11) of the robot 10 occupies the space represented by the element 510B. For example, a space immediately next to a wall, despite not actually containing the wall, may be too close to the wall for the robot 10 to stand without colliding with the wall.

The yaw free elements 510C are the opposite of the yaw collision elements 510B in that no yaw configurations 512 will result in a collision with a body obstacle. Put another way, a yaw free element 510C represents an area in the environment 8 where the robot 10 may spin through all yaw configurations 512 (i.e., spin 360 degrees with a center of axis at the select point) without colliding with a body obstacle. The yaw constrained elements 510D are elements where some yaw configurations 512 are safe or valid (i.e., the robot 10 will not collide with an obstacle) and some yaw configurations 512 are not safe (i.e., invalid yaw configurations 512 where the robot 10, in those yaw configurations 512, will collide with an obstacle). For example, the robot 10 may be able to travel next to and parallel to a wall, but turning 90 degrees may cause a collision with a wall. In this example, some yaw configurations 512 (i.e., the yaw configurations 512 where the robot 10 is parallel with the wall) are safe while other (i.e., the yaw configurations 512 where the robot is perpendicular with the wall) are not safe.

Figure 6:
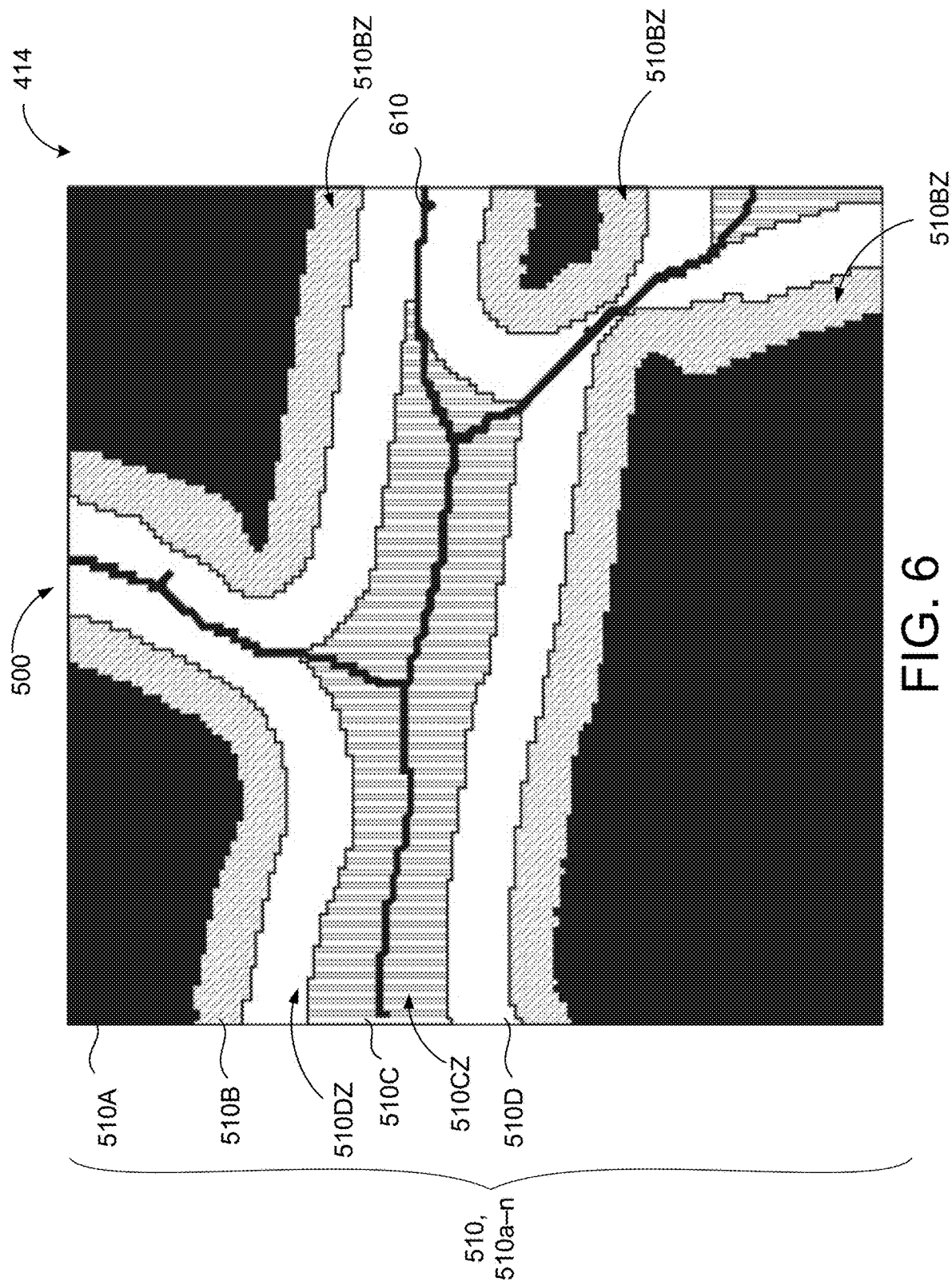
FIG. 6 is a schematic view of the configuration space map of FIG. 5 overlaid with a Voronoi cells.

The sparse graph generator 410, in some examples, determines valid paths through yaw constrained zones 510DZ (i.e., a zone of yaw constrained elements 510D) of the compressed configuration space map 500. Referring now to FIG. 6, in some implementations, the sparse graph generator 410 overlays the compressed configuration space map 500 with a plurality of Voronoi cells 610. The Voronoi cells 610 include all elements 510 in yaw constrained zones 510DZ and/or yaw free zones 510CZ that are equidistant from at least two elements 510 categorized as yaw collision elements 510B. Put another way, the Voronoi cells 610 are elements 510 that are the furthest from yaw collision zones 510BZ (and therefore furthest from the body obstacles). Alternatively, the Voronoi cells 610 include all elements 510 in yaw constrained zones 510DZ and/or yaw free zones 510CZ that are equidistant from at least two body obstacle elements 510A. In the example of FIG. 6, the cells 610 are centered in the yaw free zones 510CZ and yaw constrained zones 510DZ between the yaw collision zones 510BZ. The Voronoi cells 610 are simple to compute from data that the robot 10 may already have access to (e.g., a signed distance field).

Figure 7:
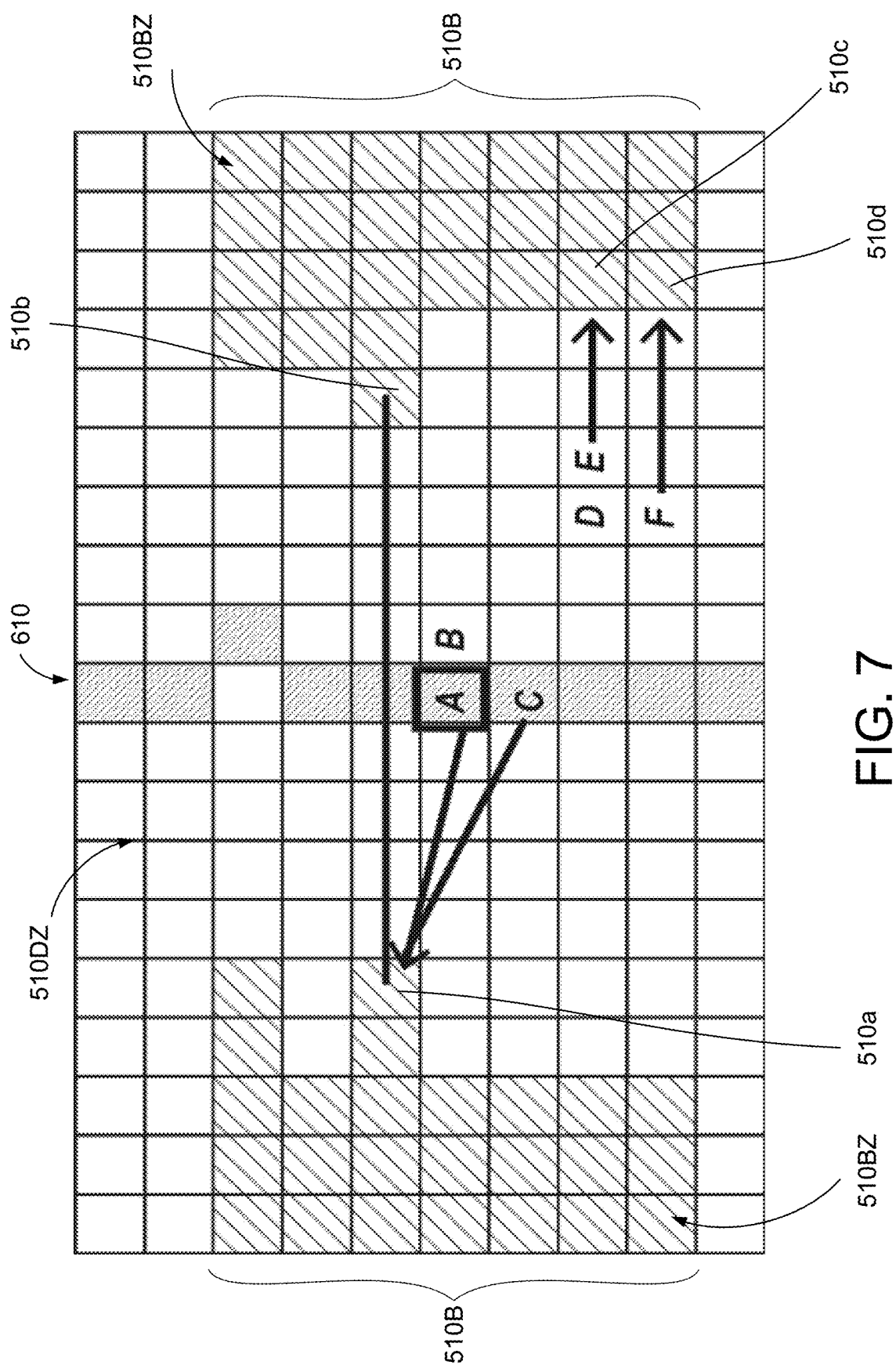
FIG. 7 is a schematic view of the Voronoi cells of FIG. 6 showing distances between elements and the nearest obstacle for the Voronoi cell.

To determine the elements 510 to mark as Voronoi cells 610, the sparse graph generator 410 determines the elements 510 (of the configuration space map 500) that are equidistant from obstacles (i.e., body obstacle elements 510A) on the configuration space map 500. That is, each element 510 inherently has a distance and direction to a nearest obstacle boundary. FIG. 7 depicts a portion of the configuration space map 500 including two yaw collision zones 510BZ separated by a yaw constrained zone 510DZ. A few Voronoi cells 610 run through the yaw constrained zone 510DZ and between the yaw collision zones 510BZ. In some examples, the sparse graph generator analyzes each element 510 of the configuration space map 500 to determine if the element 510 should be marked as a Voronoi cell 610. When analyzing each element 510 to determine if the element 510 is a Voronoi cell 610, in some implementations, the sparse graph generator 410 determines if an element 510 (i.e., the element 510 currently being analyzed) and a neighboring element 510 point to substantially different locations as the nearest obstacle boundary. That is, for every element 510 in the configuration space map 500, the sparse graph generator 410 may locate the nearest obstacle boundary to the respective element, the nearest obstacle boundary of the bottom neighbor of the respective element, and the nearest obstacle boundary of the right-hand neighbor of the respective element. Whenever the distance between any two of the three nearest obstacle boundaries satisfies a threshold distance, the element 510 may be marked as a Voronoi cell 610. The threshold distance may be expressed as any number of elements (e.g., one element, two elements, five elements, etc.).

In the example shown, when the sparse graph generator 410 analyzes the element 510 labeled 'A', the sparse graph generator 410 determines that the nearest yaw collision element 510B (or body obstacle element 510A) to element 'A' is element 510a. The sparse graph generator 410 then determines the nearest yaw collision element 510B to the right-hand neighbor of the element (labeled 'B'), which in this case is element 510*b*. The sparse graph generator 410 may then determine the distance from the bottom neighbor of the element (labeled 'C') and the nearest yaw collision element 510B (which, in this case, is again element 510*a*). The sparse graph generator 410 may determine if, in some examples, two out of the three nearest obstacle boundaries are within a threshold distance apart (i.e., two of the three of the distances between 'A' and 'B', 'A' and 'C', and 'B' and 'C'). When an element has two obstacle boundaries the same distance apart, the sparse graph generator 410 may determine the distances between both elements.

In this example, the distance between the nearest obstacle boundaries of 'A' and 'B' is ten elements, the distance between the nearest obstacle boundaries of 'A' and 'C' is zero elements (i.e., they share the same nearest obstacle boundary) and the distance between the nearest obstacle boundaries of 'B' and 'C' is again ten elements. When the threshold distance is less than ten elements, element 'A' will be marked as a Voronoi cell 610.

As previously discussed, the sparse graph generator may 410 make a similar analysis for each element of the configuration space map 500. With continued reference to FIG. 7, the sparse graph generator 410 may not mark element 'D' as a Voronoi cell 610, as the three nearest obstacle distances with its right-hand neighbor ('E') and bottom neighbor ('F') do not satisfy the threshold (e.g., three elements). This is because the distance between the nearest obstacle boundaries (i.e., elements 510*c*, 510*d*) is only one element, which may not satisfy the threshold.

Figure 8A:
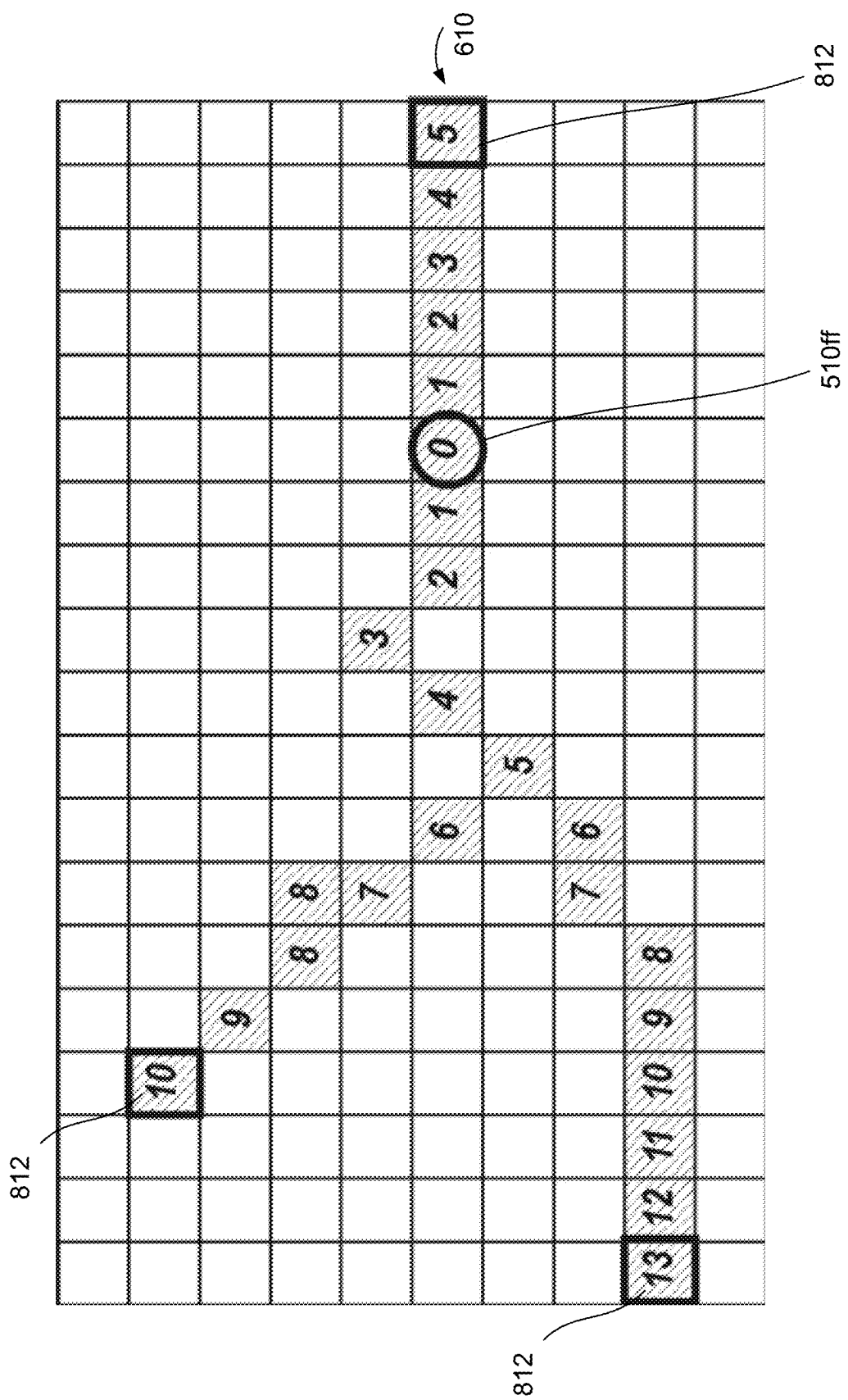
FIGS. 8A-8E are schematic views of a flood fill algorithm filling the Voronoi cells of FIG. 6.
Figure 8B:
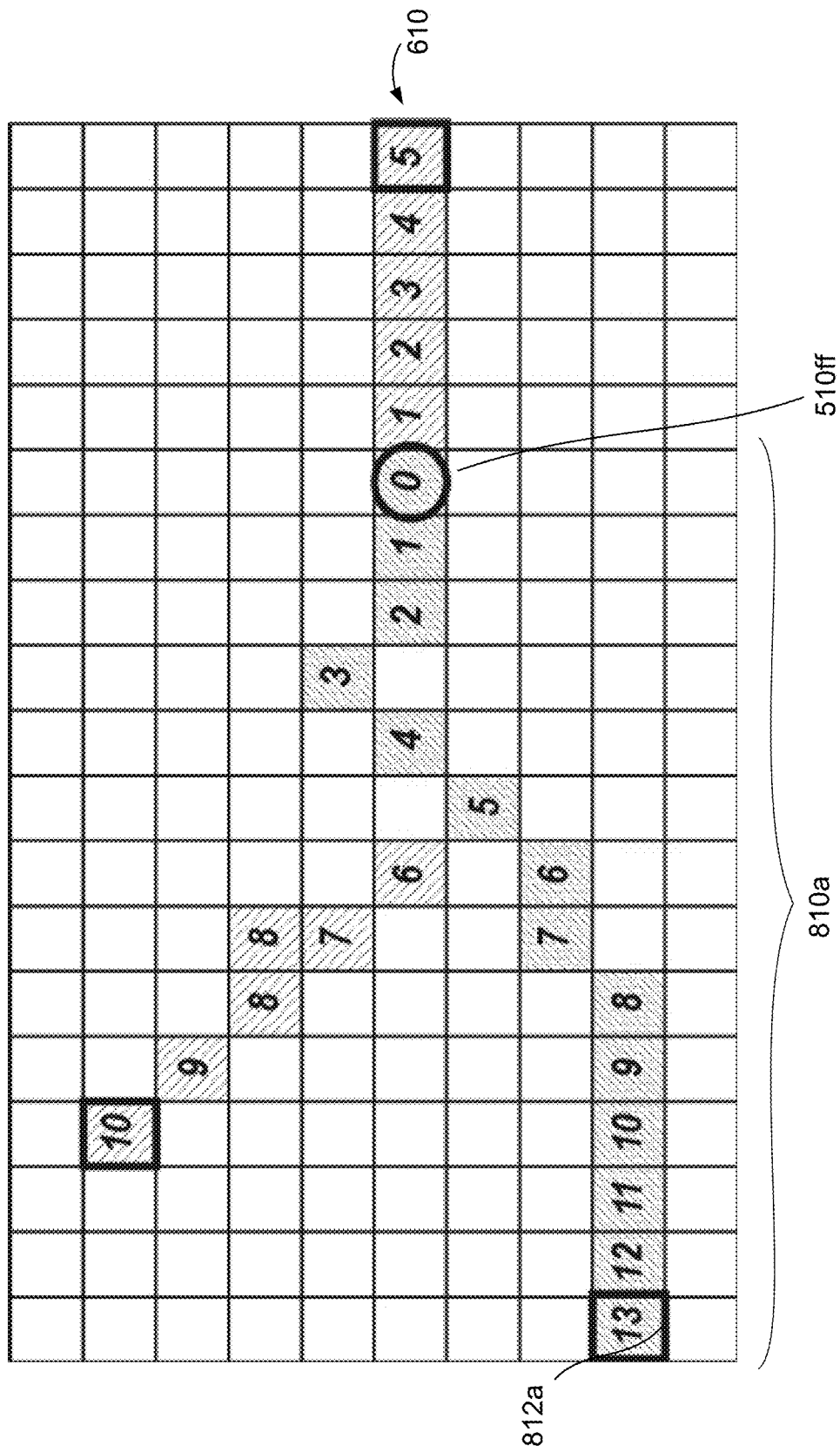
Figure 8C:
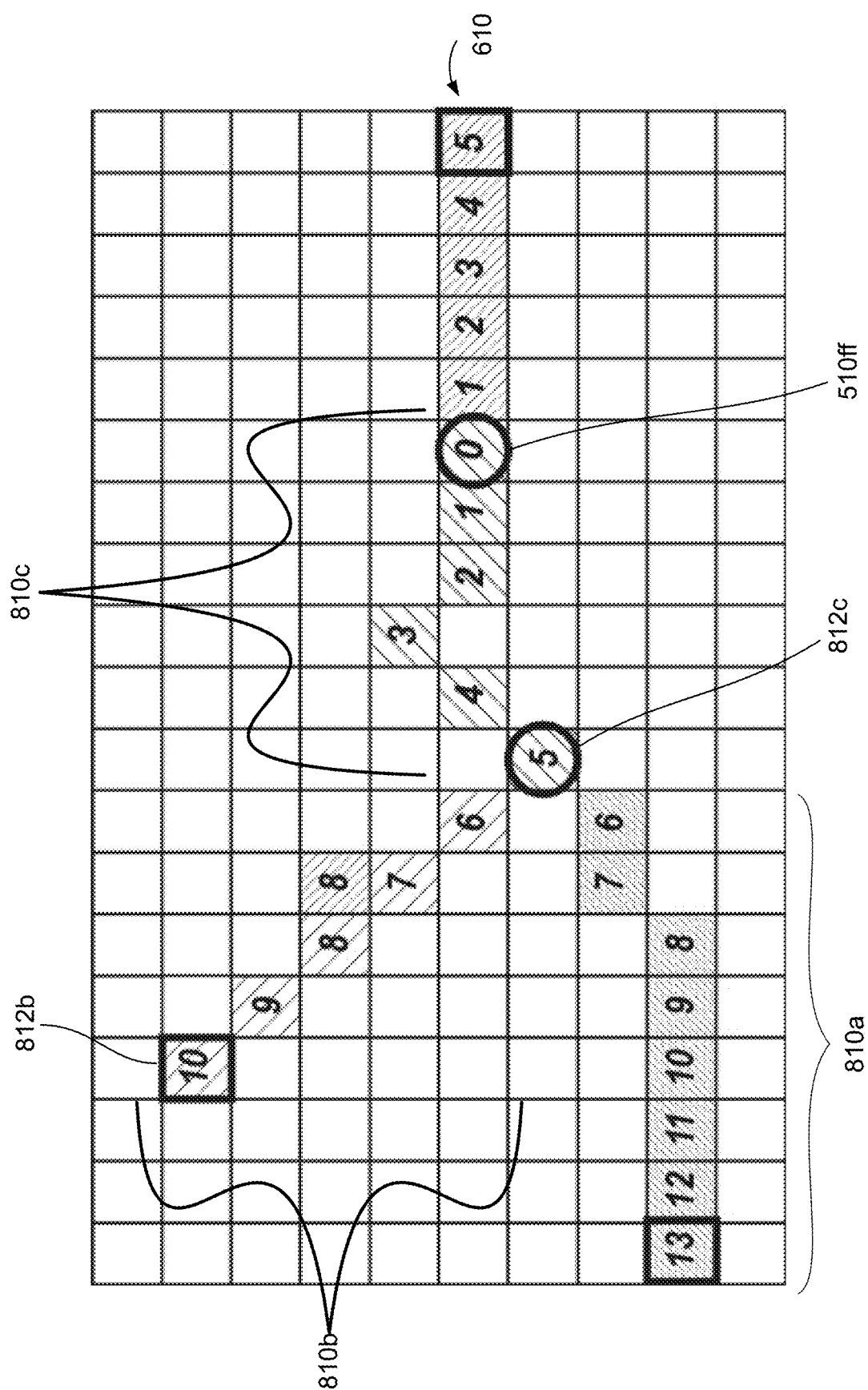

Referring now to FIGS. 8A-8E, the sparse graph generator 410, in some implementations, determines edges 810 and nodes 812 derived from the Voronoi cells 610. FIG. 8A illustrates exemplary Voronoi cells 610 in a yaw constrained zone 510DZ. The sparse graph generator, in some implementations, selects an arbitrary (i.e., random or near random) element 510*ff* marked as a Voronoi cell 610. Starting from the arbitrary element 510*ff*, the sparse graph generator performs a flood fill and records a distance from each element 510 marked as a Voronoi cell 610 to the arbitrarily selected element 510*ff*. In the example shown, each element is labeled with the distance (in elements) from the arbitrary element 510*ff*. Flood fill is an algorithm that determines an area that is connected to a given node in an array. In this case, the flood fill continues to flow through all elements 510 marked as Voronoi cells 610 until all are assigned a distance. While the arbitrarily selected element 510*ff* may be selected entirely at random, it may be advantageous to limit the selection to elements 510 within the vicinity of the robot 10 in order to minimize effects from any error.

After each element marked as a Voronoi cell 610 is assigned a distance, the sparse graph generator 410, in some examples, determines an end or end node 812 of each branch of Voronoi cells 610. The end node 812 of each branch will have locally the largest distance from the arbitrarily selected element 510*ff*. From the end node 812 of a branch, the sparse graph generator 410, in some examples, marks each element 510 while traveling back toward the selected element 510*ff*. Each time the sparse graph generator 410 encounters an element 510 already previously marked, the generator may attach a unique label to the combination to the element. For example, in FIG. 8B, the sparse graph generator 410 starts at the end node 812*a* and travels back toward the selected element 510*ff*, marking each element along the way to form an edge 810*a*. That is, the Voronoi cells 610 from the end node 812*a* to the selected element 510*ff* may form the edge 810*a*. The sparse graph generator 410 may continue this process until all elements have been marked. For examples, in FIG. 8C, the sparse graph generator 410 travels from the end node 812*b* toward the element 510*ff* and marks each element to form another edge 810*b* until a previously marked element is encountered (FIG. 8B) at 812*c*. The sparse graph generator 410 may assign a unique label to the junction element at 812*c* (i.e., the first element encountered that had been previously marked). The sparse graph generator 410 may continue travelling back until arriving at the selected element 510*ff*, noting each element that was previously marked as a separate edge 810*c*.

Figure 8D:
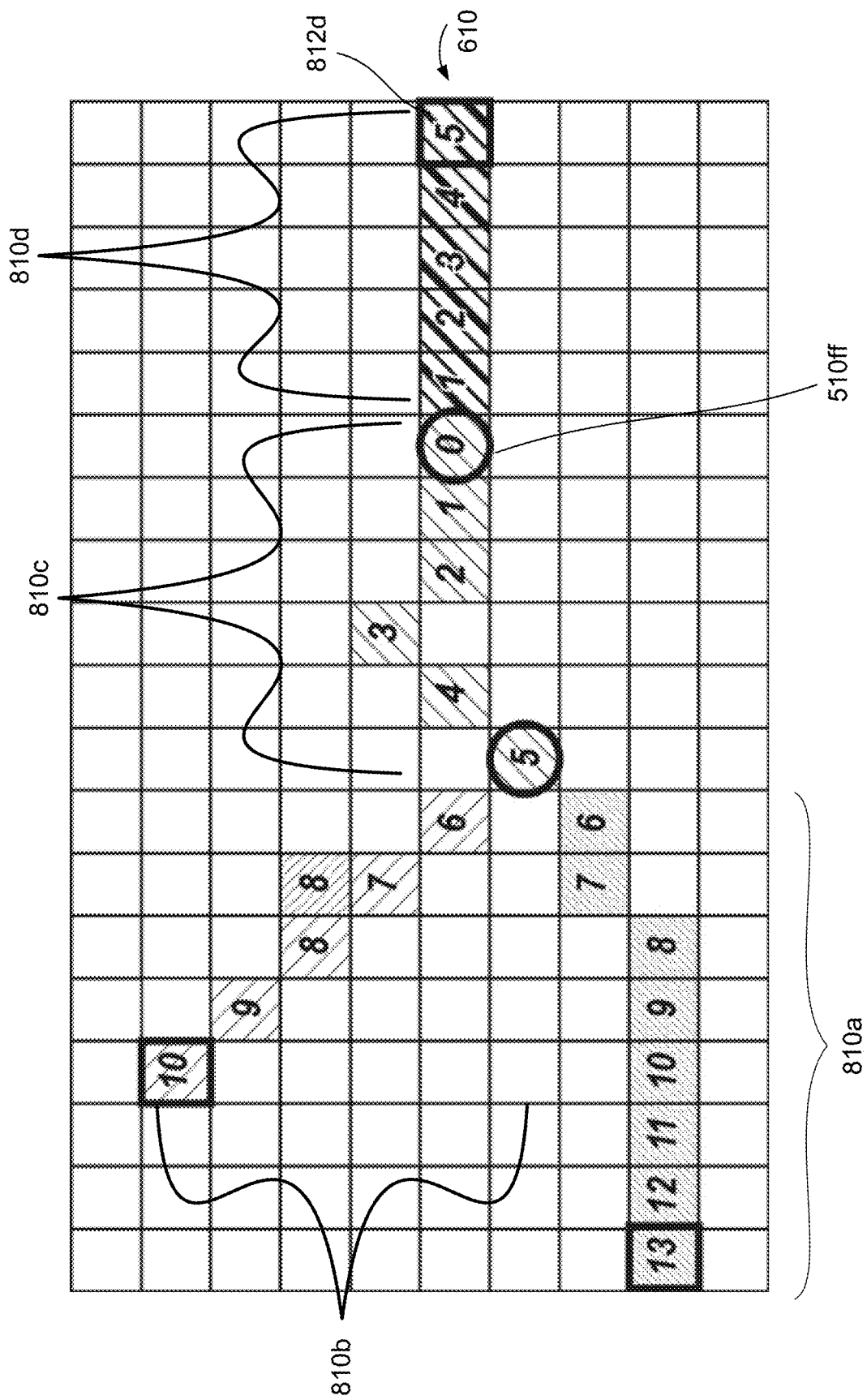
Figure 8E:
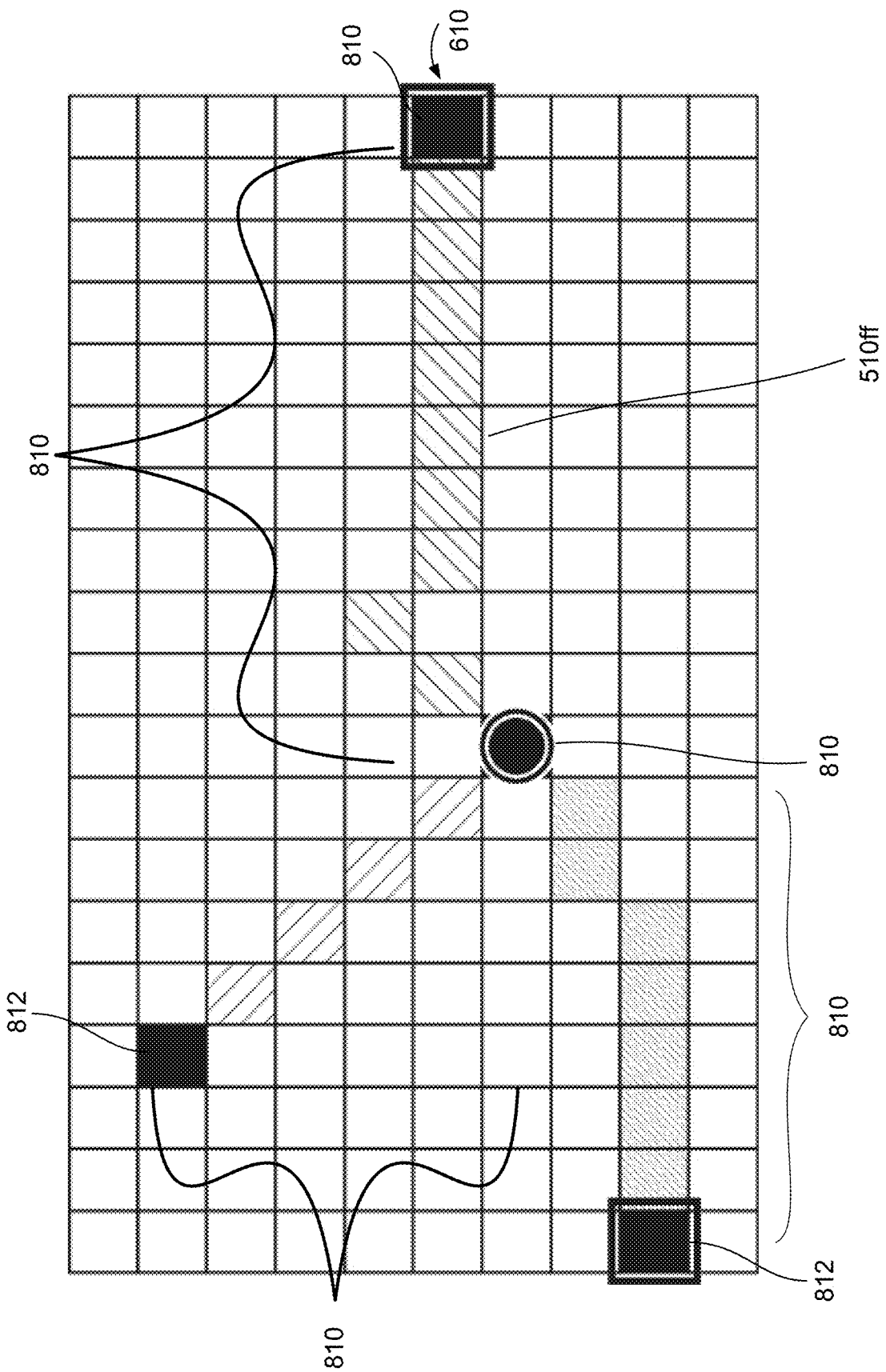

Referring now to FIG. 8D, the sparse graph generator 410 may start from the end node 812*d* and travel back to the element 510*ff*, again marking each element along the way to form another edge 810*d*. After all elements 510 have been marked (and assigned to an edge 810), the sparse graph generator 410, in some implementations, determines if the selected element 510*ff* only touches two edges 810 (i.e., is not a junction between three or more edges). In this scenario, the sparse graph generator 410 may combine the two edges into a single edge. For example, as illustrated in FIG. 8D, the selected element 510*ff* only touches two other edges (i.e., edge 810*c* and edge 810*d*) and in FIG. 8E, the edge 810*c* and the edge 810*d* are combined into a single edge 810. The end result of the flood fill and element marking provides the sparse graph generator 410 with an ordered set of elements 510 along edges 810 and a list of node elements 812. The list of nodes and edges form the sparse graph 416S and represent valid paths the robot 10 may travel through the constrained spaces of the nearby environment (i.e., the yaw constrained zones 510DZ of the compressed configuration space map 500)

Figure 9:
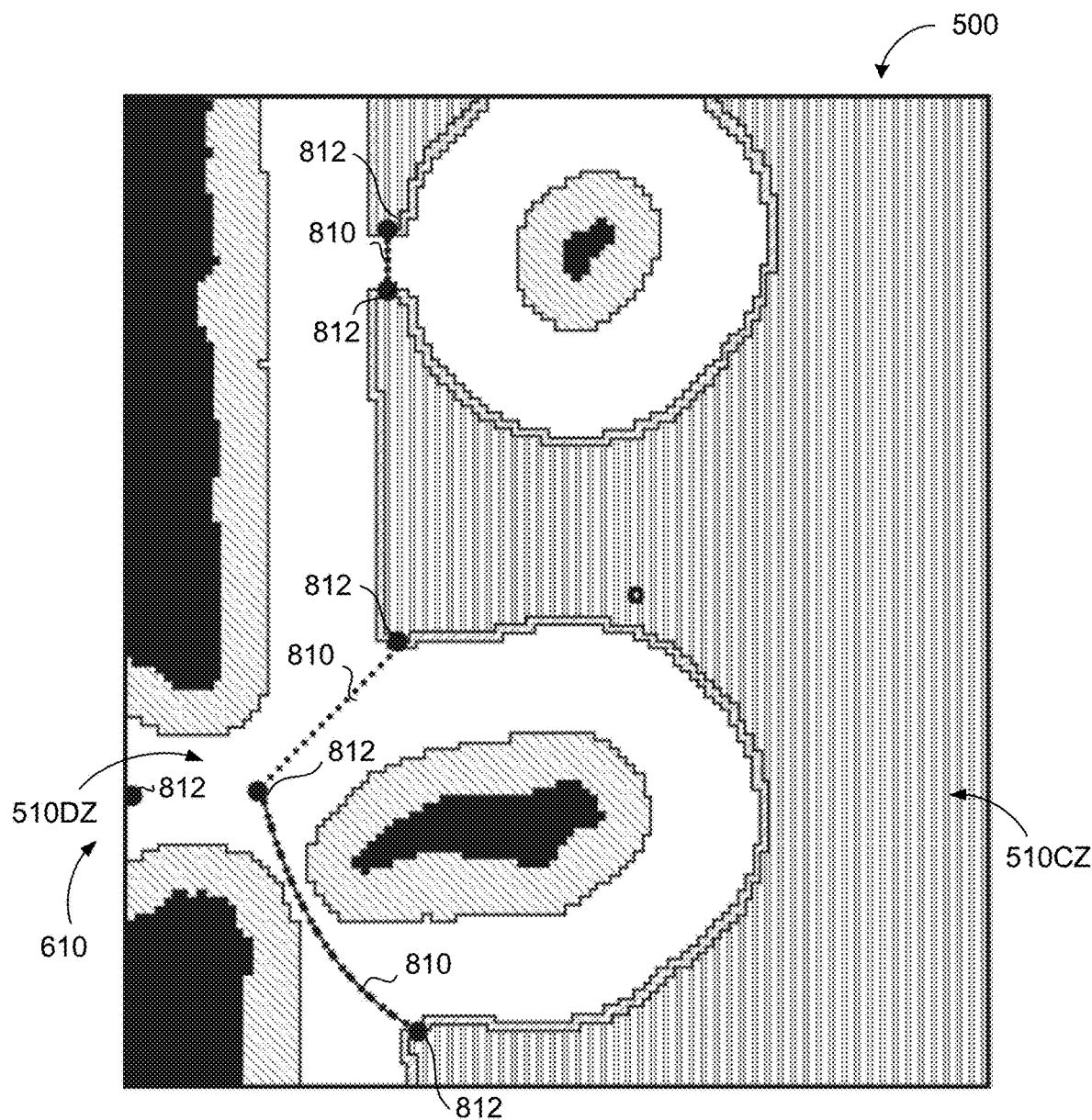
FIG. 9 is a schematic view of edges and nodes derived from the Voronoi cells of FIG. 6.
Figure 10:
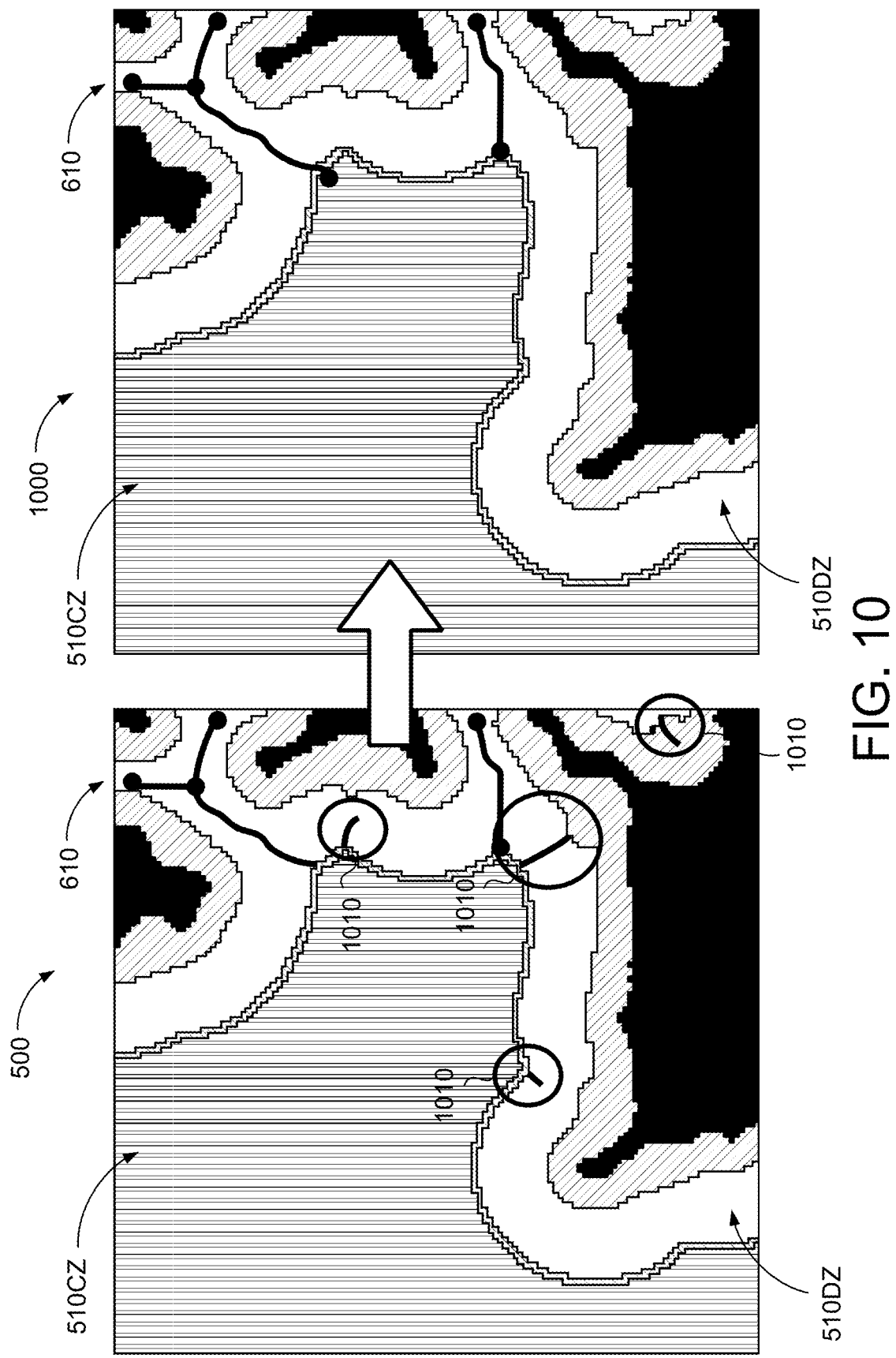
FIG. 10 is a schematic view of pruned edges and nodes derived from the Voronoi cells of FIG. 6.

FIG. 9 illustrates a configuration space map 500 overlaid with the Voronoi cells 610 categorized into a number of edges 810 and nodes 812, each edge 810 connecting either to another edge 810 (through a node 812) or to a yaw free zone 510CZ (also through a node 812). The sparse graph generator 410, when generating the sparse graph 416S, in some implementations, only considers elements 510 marked as Voronoi cells 610 that are located in yaw constrained zones 510DZ, as the path through yaw free zones 510CZ may be determined at a later point. The sparse graph generator 410, as discussed with regards to FIGS. 8A-8E, may segment the elements marked as Voronoi cells 610 into individual edges 810 and nodes 812. In some examples, the sparse graph generator 410 labels or identifies nodes 812 where the edges 810 connect to yaw free zones 510CZ. That is, the sparse graph generator 410 identifies nodes 812 (i.e., the ends or edges 810 or junctions between edges 810) along Voronoi cells 610 that connect yaw free zones 510CZ and yaw constrained zones 510DZ. The sparse graph generator 410 may further identify nodes 812 that are a junction for multiple edges 810. In some examples, the sparse graph generator 410 assumes that all nodes 812 that connect to the same yaw free zone 510CZ are connected to each other. That is, the sparse graph generator may (at least temporarily) ignore motion through yaw free zones 510CZ as long as a path between the nodes 812 exists (i.e., connected to the same yaw free zone 510CZ). Armed with the edges 810 and nodes 812, the sparse graph generator 410 may first generate a final 2D configuration map 1000 (FIG. 10) based on the previously determined edges 810 and nodes 812 in the compressed configuration space map 500 overlaid with Voronoi cells 610 by pruning off edges 810 that fail to have navigational significance. For example, FIG. 10 shows a compressed configuration space map 500 overlaid with a plurality of Voronoi cells 610 and having a number of insignificant edges 1010 that are pruned to generate the final 2D configuration map 1000. That is, the sparse graph generator 410, in some implementations, prunes insignificant edges 1010 that are shorter than a threshold length and terminate or end within a yaw constrained zone 510DZ, as these paths are highly unlikely to be worthwhile for the robot 10 to traverse. Optionally, the threshold length may be approximately the radius of the robot 10. In some examples, the sparse graph generator 410 combines edges 810 together when, after pruning, a junction node 812 is connected to less than three edges 810.

Figure 11B:
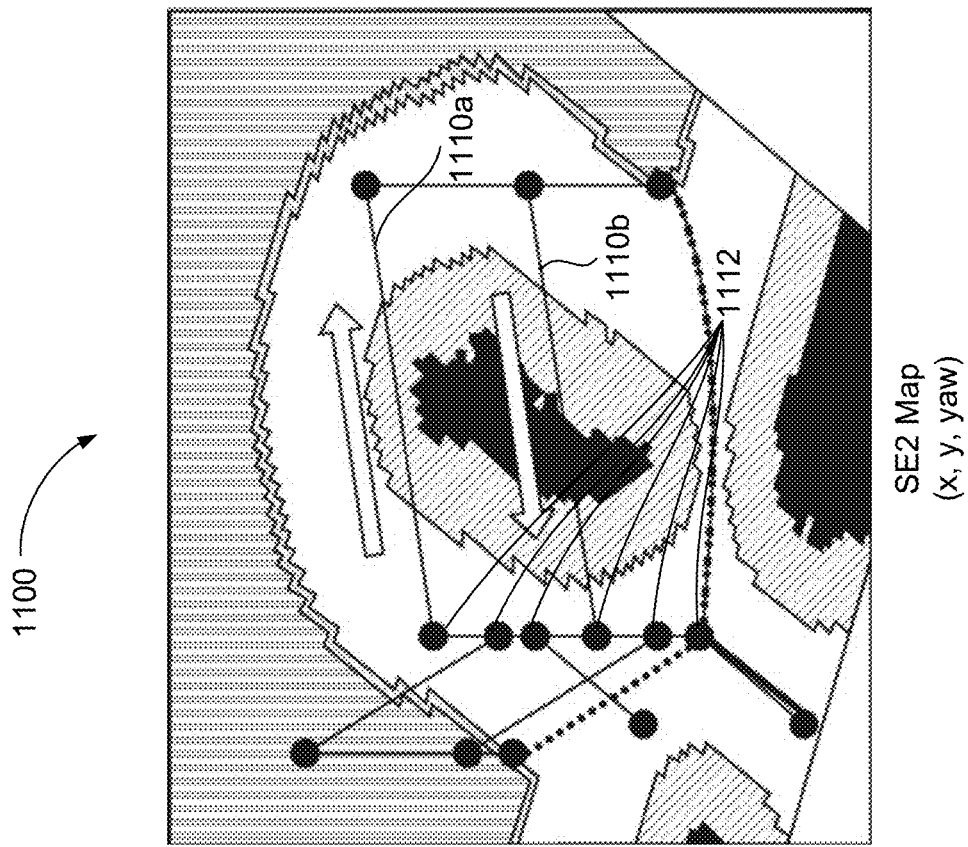
FIGS. 11A and 11B are schematic views of a two-dimensional sparse graph (FIG. 11A) and a SE2 sparse graph (FIG. 11B).
Figure 11A:
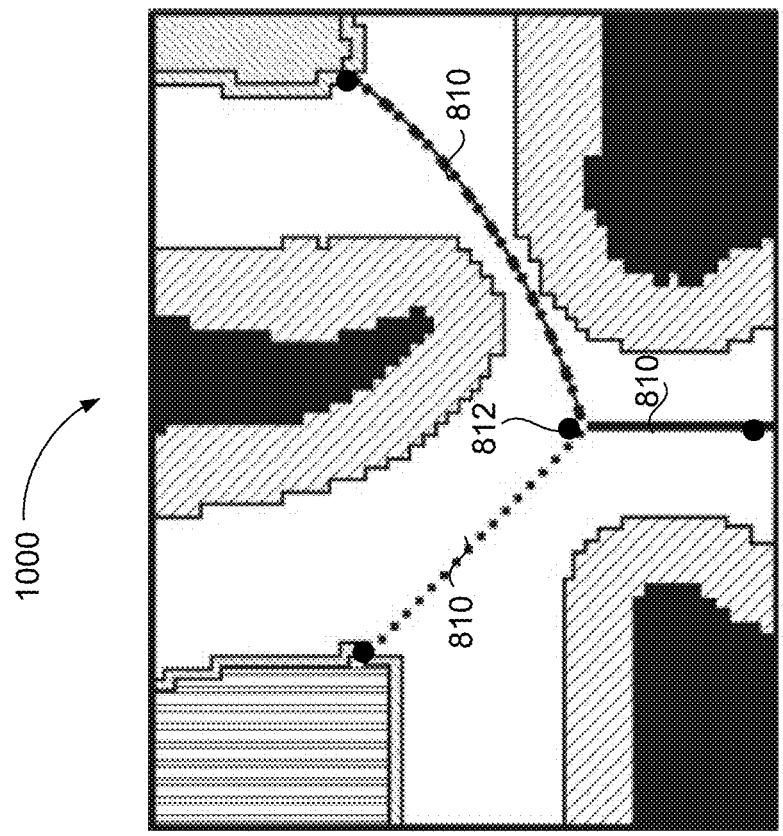

Referring now to FIGS. 11A and 11B, the sparse graph generator 410, in some implementations, converts the final 2D configuration map 1000 (FIG. 11A) into an SE2 representation 1100 of the map (FIG. 11B). SE2 is a coordinate system that includes yaw with standard Cartesian coordinates (i.e., an x coordinate, a y coordinate, and yaw). That is, the SE2 map 1100 takes the final 2D configuration map 1000 and includes yaw. FIG. 11B illustrates an SE2 map 1100 where the yaw is the height. While the robot 10 may have any number of yaw configurations 512 (e.g., 64 as previously discussed), the SE2 map 1100 may be simplified by only considering two yaw configuration—forward and backward. That is, generally, the robot 10 will travel in a yaw configuration 512 that aligns with its path of travel, and thus the SE2 map 1100 may be greatly simplified by only accounting for these two yaw configurations. Each edge 810 of the 2D map 1000 may be represented by two SE2 edges with opposite tangents (i.e., "forward" and "backward" yaw configurations) 1110a, 1110b. Each 2D node 812 (FIG. 11A) is represented by two times the number of edges 1110 (FIG. 11B) connected to the node 812 in the 2D map 1000 representation. For example, FIG. 11A illustrates three edges 810 connected at a single node 812, which translates to six nodes 1112 in the SE2 map 1100. It is implied that the robot 10 will rotate in place at the nodes 1112 and the sparse graph generator 410 may determine the interconnection between the nodes 1112 based on the valid yaw configurations 512 from the full configuration space map 414.

To finalize the SE2 map 1100, in some implementations, the sparse graph generator 410 determines an entry and exit point from the map 1100 for the robot 10. Referring now to FIGS. 12A and 12B, the sparse graph generator 410 may project an off-map goal 1210 (i.e., a target destination) along a straight line to the map 1100 boundary. When the goal 1210 is set in a yaw free zone 510CZ, the sparse graph generator 410 may use the respective element associated with the goal 1210. However, when in a yaw constrained zone 510DZ, the sparse graph generator 410 may search along the nearest element 510 that is marked as a Voronoi cell 610 (from the 2D map 1000) or a yaw free zone 510CZ boundary. If the nearest element is on a yaw free zone 510CZ boundary, the sparse graph generator 410 may set that element as the goal. When the nearest element is on an edge 810 is marked as a Voronoi cell 610, the sparse graph generator 410 may split the edge 810 in two by placing a new node 1220 at the respective nearest element. In the illustrated example of FIG. 12A, a goal 1210 is set in a yaw constrained zone 510DZ. The sparse graph generator determines that the nearest desired element is a Voronoi cell 610. The sparse graph generator 410 creates a new node 1220 at the element nearest the goal 1210 and separates the previous edge 810 into two separate edges 810. In some implementations, the sparse graph generator 410 creates two new nodes 1220, with one node 1220 representing the forward yaw configuration 512 and one node 1220 representing the backward yaw configuration 512.

Once the new nodes 1220 have been placed, the sparse graph generator 410 determines if a starting position of the robot 10 (e.g., the current location of the robot) is connected the forward yaw configuration node 1220, the backward yaw configuration node 1220, or both. That is, the sparse graph generator 410 determines if the robot 10 is capable of connecting to the nodes 1220 with the respective yaw configuration. The sparse graph generator 410, in some examples, determines an angle 1222 between the original or true goal 1210 and the two yaw configurations of the edge 810 along the new node 1220 (i.e., forward and backward). In the example shown in FIG. 12B, when the angle satisfies a threshold (e.g., when the angle is within zone 1230), the forward-facing node 1220 is connected to the robot's location. When the angle satisfies a second threshold (e.g., when the angle is within zone 1240), the backward-facing node 1220 is connected to the robot's location. When the angle satisfies a third threshold (e.g., when the angle is within zones 1250), both the forward-facing node 1220 and the backward-facing node 1220 are connected to the robot's starting location. That is, the robot 10 could travel to the location of the nodes 1220 facing either forward or backward.

In some examples, the sparse graph generator 410 connects nodes 812 that indicate the robot 10 will collide with an obstacle. For example, the sparse graph generator 410 may always assume that the robot turns by rotating from a center point, which may make some turns impossible. However, in some situations, the low-level path generator 130 may still be able to navigate the path by turning on a pivot point that is not at the center of the robot 10, and in these situations, the sparse graph generator 410 may create edges 810 between nodes 812 that the generator 120 may otherwise determine the robot incapable of traversing.

Figure 13:
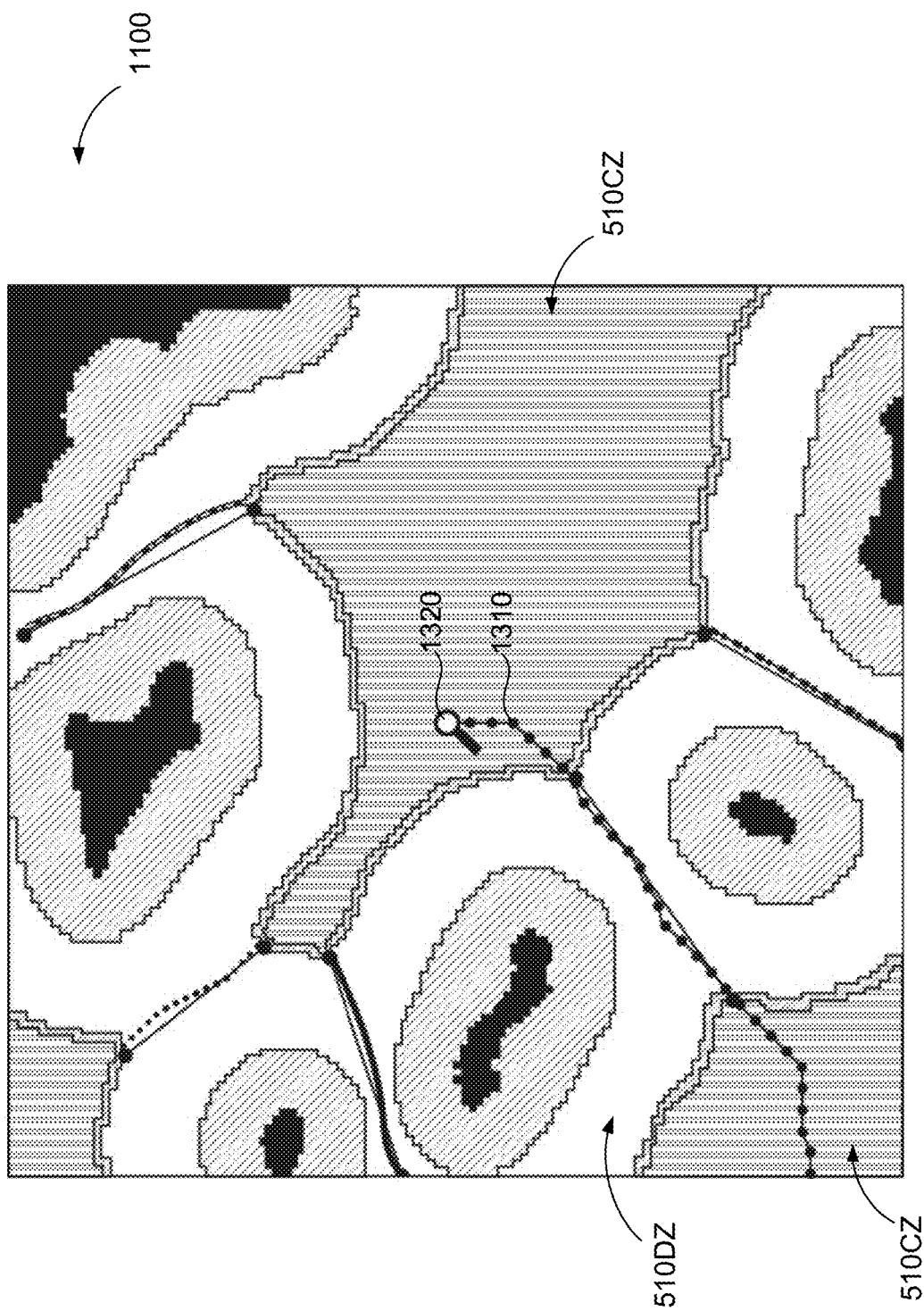
FIG. 13 is a schematic view of a path through yaw free zones and yaw constrained zones.

Referring back to FIG. 4, the intermediate waypoint generator 120 also includes the coarse path planner 420 configured to receive the sparse graph 416S from the sparse graph generator 410 and determine a topologically correct path (i.e., a coarse path 1310) for the robot 10 to travel to reach the goal 1210, i.e., the node 1220 (FIG. 12A) corresponding to the target destination. In some implementations, the coarse path planner 420 also receives the full configuration space map 414 and/or the compressed configuration space map 500. Referring now to FIGS. 4 and 13, the map 1100 includes a coarse path 1310 that navigates from a start point 1320, in a yaw free zone 510CZ, through a yaw constrained zone 510DZ to another yaw free zone 510CZ.

To generate the path 1310, the coarse path planner 420 may implement a search algorithm (e.g., an A* search algorithm). The coarse path planner 420 may use the search algorithm to search a dense grid or graph 416D of the 2D yaw free zones 510CZ to plot the path 1310. The sparse graph generator 410 may also generate the dense graph 416D and combine it with the sparse graph 416S and send the combined graph to the coarse path planner 420. Alternatively, the coarse path planner may generate that dense graph 416D. The dense graph is a list of interconnected nodes of yaw free zones 510CZ determined from the compressed configuration space map 500. That is, like the sparse graph 416S includes a list of interconnected nodes 812 of elements 510 within yaw constrained zones 510DZ, the dense graph 416D includes a list of interconnected nodes of elements 510 within yaw free zones 510CZ. As the yaw free space has no need for orientation (i.e., yaw) information because the robot 10 may spin freely in yaw free zones 510CZ, the coarse path planner 420 may search the dense graph 416D (dense relative to the sparse graph 416S). The coarse path planner 420 may combine the sparse graph 416S and the dense graph 416D to form a final graph 416F. The final graph 416F includes all interconnected nodes within both the yaw free zones 510CZ and the yaw constrained zones 510DZ. The coarse path planner 420 may also use the search algorithm to search the final graph 416F for the Voronoi cells 610 in yaw constrained zones 510DZ with the included orientation information and the yaw free zones 510CZ. The coarse path planner 420 may link the yaw free zone 510CZ with the yaw constrained zone 510DZ and traverse the yaw constrained zone 510DZ with the coarse path 1310.

Because the dense graph 416D lacks orientation information (and thus the final graph 416F lacks orientation information in the yaw free zones 510CZ), the coarse path planner 420, in some implementations, determines whether any orientation (i.e., forward or backward) for any edges 810 should be reversed. Optionally, the coarse path planner 420 is biased to walk forward facing along an edge 810. The coarse path planner 420 may identify segments of the path 1310 that are capable of having the yaw orientation reversed (i.e., both forward and backward orientations are valid). The coarse path planner 420 may then calculate a cost (i.e., an amount of rotation required) of traversing the path 1310.

Figure 14:
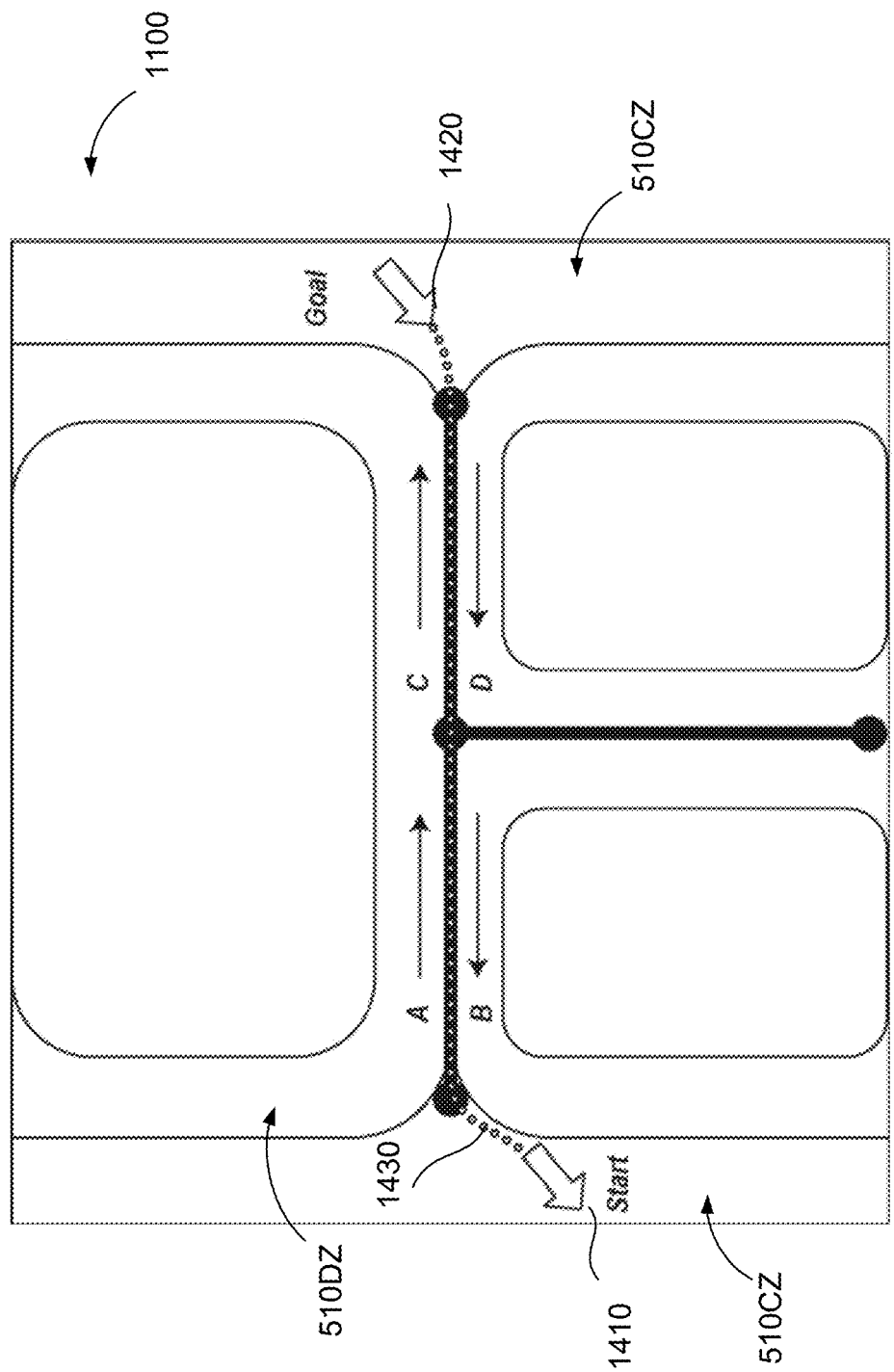
FIG. 14 is a schematic view of a path through a yaw constrained zone.

For example, referring now to the map 1100 of FIG. 14, the coarse path planner 420 has planned a path 1430 from a start location 1410 (with an orientation that aligns with the respective arrow) to a goal location 1420 (with an orientation that aligns with the respective arrow). Due to the forward bias, the search algorithm may choose a forward facing orientation (path A-C) through the yaw constrained zone 510DZ. The coarse path planner 420, optionally, computes a cost for both path A-C (facing forward) and path B-D (facing backward). In the given example, because the given start and goal orientations face backward, a backward path of B-D is cheaper (i.e., requires less rotation) than the forward facing path A-C and the coarse path planner 420 may update the path 1430 accordingly.

Referring back to FIG. 4, the intermediate waypoint generator 120, in some implementations, also includes a waypoint placer 430. The waypoint placer 430 receives the full configuration space map 414 and the sparse graph 416S with the path 1310 from the coarse path planner 420. The waypoint placer 430 processes the path 1310 for appropriate locations to place intermediate waypoints 310. The waypoint placer 430, in some examples, searches along the path 1310 until line-of-sight is first lost (e.g., because of an obstacle) and places a waypoint 310 at that location. Optionally, the waypoint placer 430 downsamples the path 1310 prior to searching to reduce processing time.

Figure 15A:
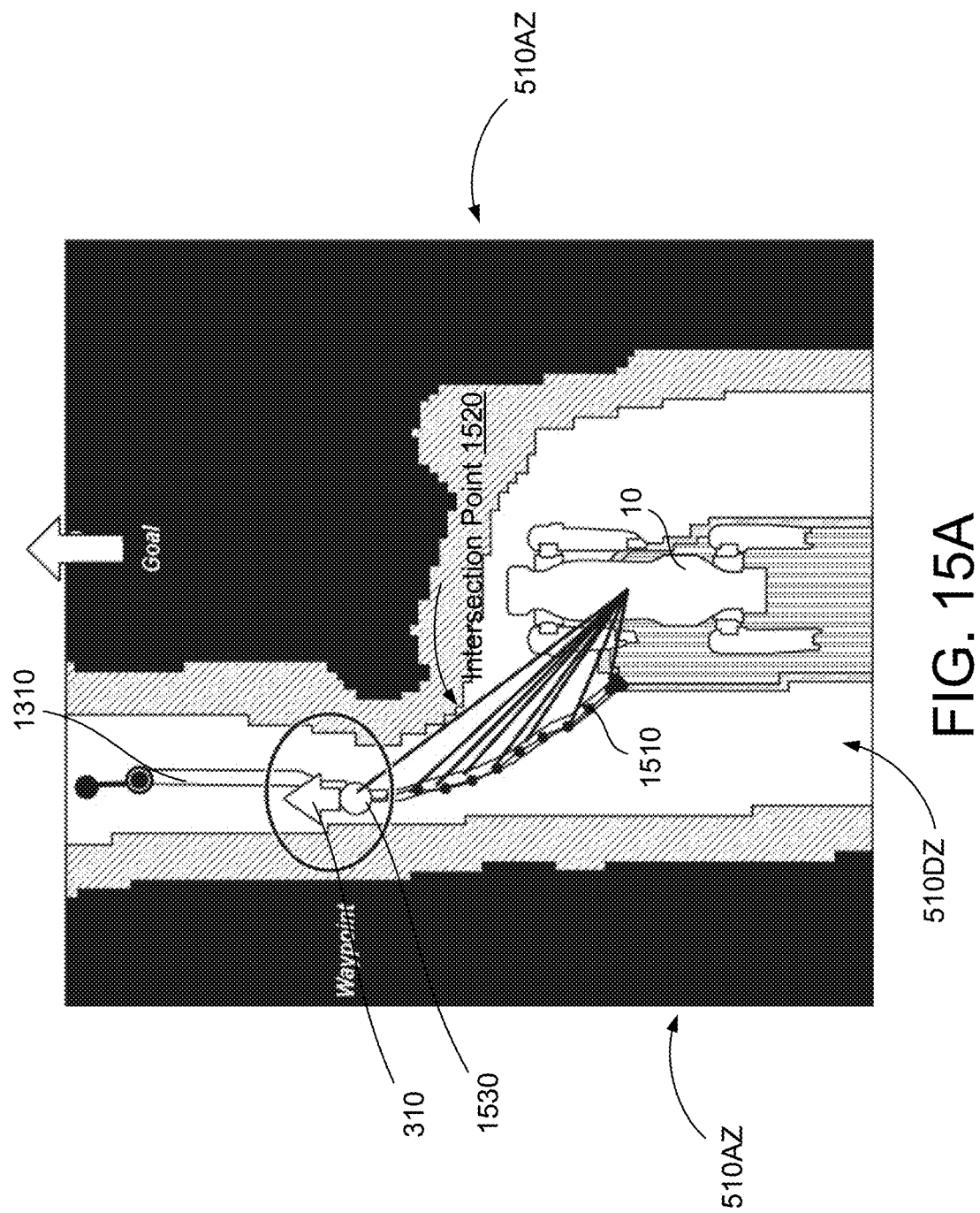
FIGS. 15A and 15B are schematic views of a navigation route for a robot including intermediate waypoints placed at locations where line-of-sight is lost.

Referring now to FIG. 15A, a robot 10 navigates along a path 1310 through a yaw constrained zone 510DZ that lies between two body obstacle zones 510AZ. The waypoint placer 430 draws rays 1510 from the current location of the robot 10 to various points along the path 1310. When one of the rays 1510 intersects a portion of the body obstacle zone 510AZ (or, alternatively, within a threshold distance of the body obstacle zone 510AZ to account for a width of the robot 10), the waypoint placer 430 places an intermediate waypoint 310 at the point 1530 on the path 1310 where the ray 1510 intersects the path 1310 at or just before line of sight is lost. Thus, determining the location that line-of-sight is lost is relatively straightforward in Cartesian coordinates (i.e., x and y coordinates). However, determining line-of-sight in SE2 space (i.e., including yaw) is more complicated.

Figure 15B:
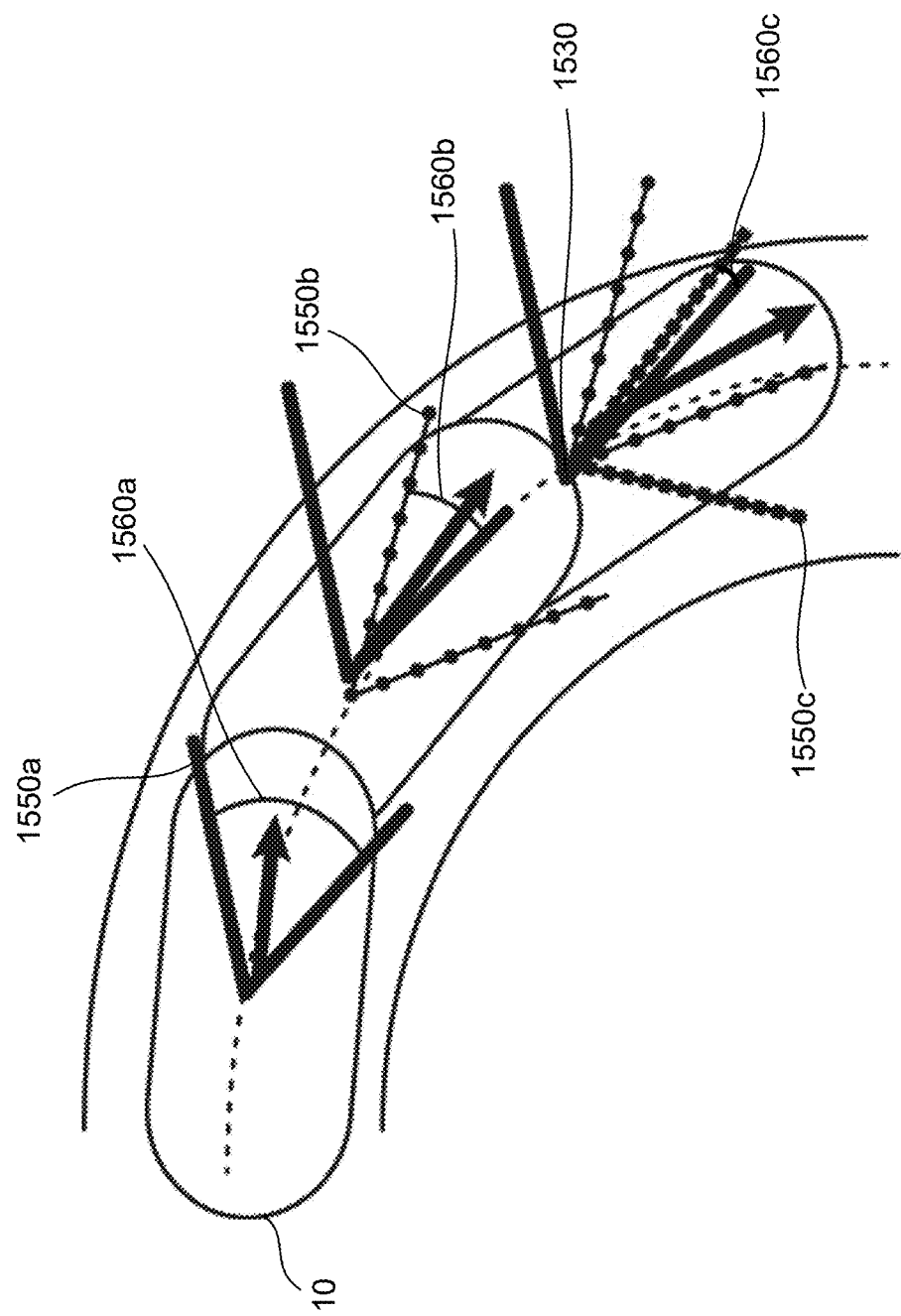

Referring to FIG. 15B, to address the inclusion of yaw, the waypoint placer 430 may, at each point along the downsampled path 1310, determine a minimum allowable yaw and a maximum allowable yaw to generate an envelope 1550, 1550a—n. The waypoint placer 430, in some examples, tracks the smallest (i.e., the innermost) envelope 1560, 1560a—n at each downsampled point and places an intermediate waypoint 310 when either the envelope width drops below an envelope threshold or the required yaw configuration at the point 1530 on the path 1310 is outside the envelope 1550. In the example shown, the yaw of the envelope 1550c is outside the inner envelope 1560c and a candidate for an intermediate waypoint 310.

In some examples, the waypoint placer 430 also adds an intermediate waypoint 310 when moving from a yaw free zone 510CZ to a yaw constrained zone 510DZ if orientation changes by more than a threshold amount (e.g., 60 degrees). Optionally, the waypoint placer 430 may add an intermediate waypoint 310 at the end of the path 1310 when the orientation at the goal (i.e., a goal pose) is off the current map (i.e., too far from the robot's current location) and line-of-sight to the goal is lost. Additionally, the waypoint placer 430 may shift waypoints away from junctions in narrow spaces. For example, an intermediate waypoint 310 may be projected down the path 1310 until outside a threshold radius around the junction.

High-level waypoints 210 may include two coordinates indicating a position on a plane (i.e., x and y coordinates), a yaw value, and a time value. The time value may indicate an estimated amount of time for the robot to navigate to the respective waypoint 310. Along with the x, y, and yaw values, the waypoint placer 430 may similarly add an estimated time value to the intermediate waypoints 310. The estimated time value may be determined by taking the maximum amount of time from the starting location to the waypoint in x, y, and yaw using any speed limits received. The waypoint placer 430 may offset the time for each high-level waypoint 210 on the planned trajectory after the intermediate waypoint 310.

Referring back to FIG. 4, the waypoint placer 430 adds any intermediate waypoints 310 to the high-level waypoints 210 of the navigation route 112. The intermediate waypoint generator passes the navigation route 112 to the low-level path generator 130 to generate the step plan 142 to navigate to each waypoint 210, 310. In scenarios where the intermediate waypoint generator 120 determines an intermediate waypoint 310 is not necessary (or fails to find an adequate location), the intermediate waypoint generator 120 may pass the received navigation route 112 unaltered to the low-level path generator 130.

Figure 16:
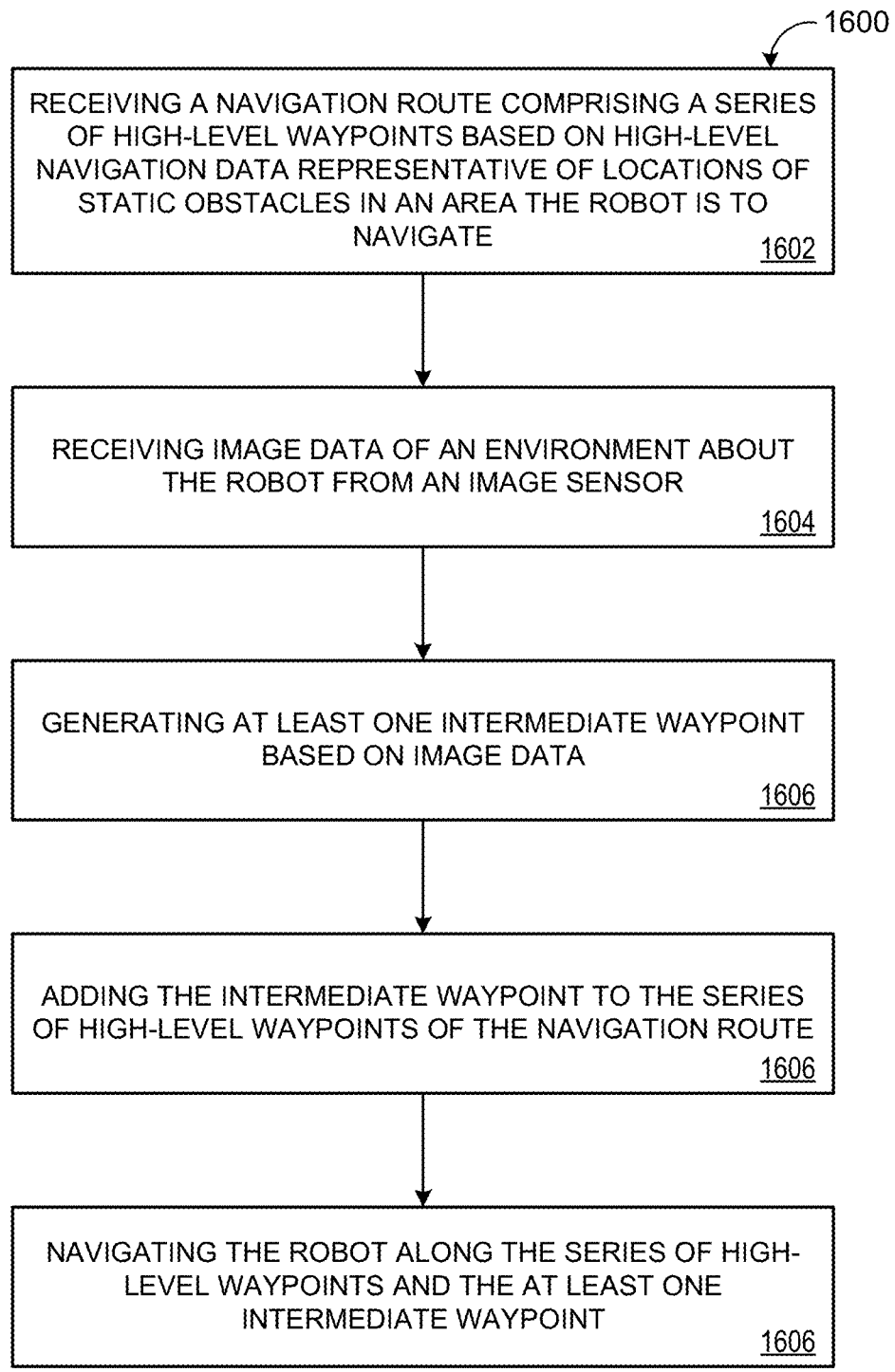
FIG. 16 is a flowchart of an example method for generating intermediate waypoints for a navigation system of a robot.

FIG. 16 is a flowchart of an exemplary arrangement of operations for a method 1600 for generating intermediate waypoints 310 for a robot 10. At operation 1602, the method 1600 includes receiving, at data processing hardware 36 of a robot 10, a navigation route 112. The navigation route 112 includes a series of high-level waypoints 210 that begin at a starting location 113 and end at a destination location 114. The navigation route 112 is based on the high-level navigation data 50 that is representative of locations of static obstacles in an area the robot 10 is to navigate.

The method 1600 includes, at operation 1604, receiving, at the data processing hardware 36, image data 17 of an environment 8 about the robot 10 from an image sensor 31. At operation 1606, the method 1600 includes generating, by the data processing hardware 36, at least one intermediate waypoint 310 based on the image data 17 and, at operation 1608, adding, by the data processing hardware 36, the at least one intermediate waypoint 310 to the series of high-level waypoints 210 of the navigation route 112. At operation 1610, the method 1600 includes navigating, by the data processing hardware 36, the robot 10 from the starting location 113 along the series of high-level waypoints 210 and the at least one intermediate waypoint 310 toward the destination location 114.

Figure 17:
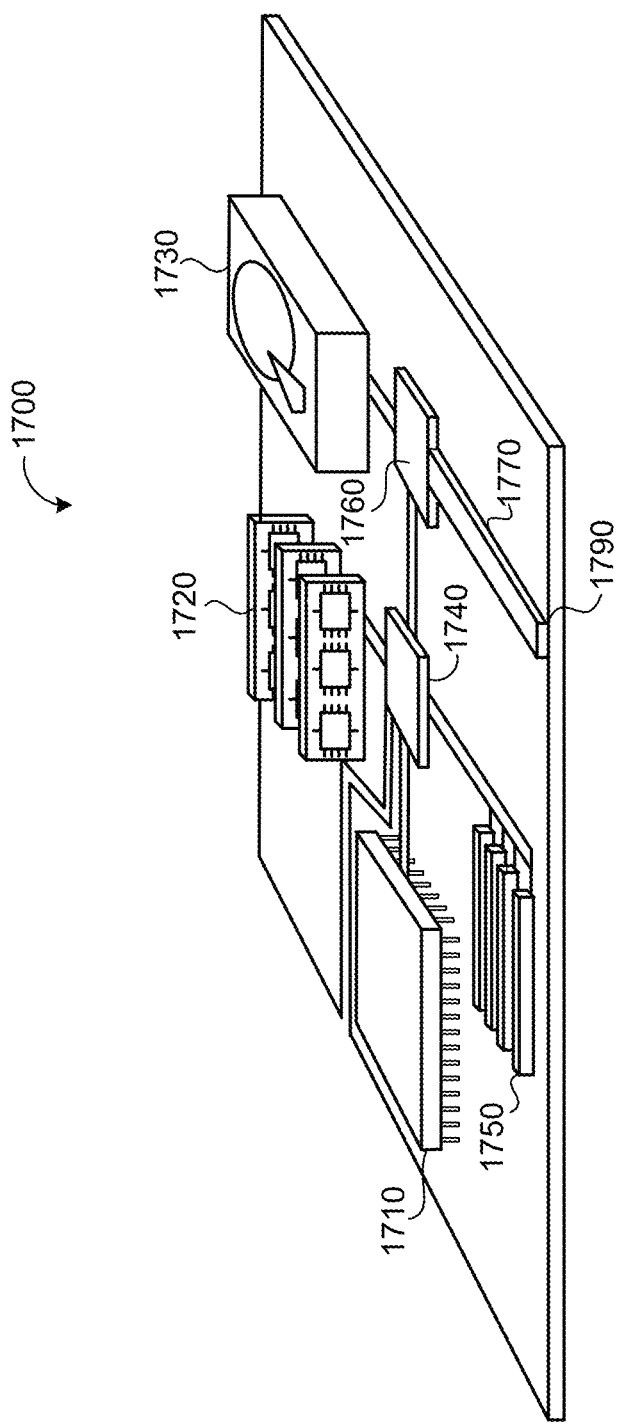
FIG. 17 is a schematic view of an example computing device that may be used to implement the systems and methods described herein.

FIG. 17 is schematic view of an example computing device 1700 that may be used to implement the systems and methods described in this document (e.g., data processing hardware 36 and memory hardware 20). The components shown here, their connections and relationships, and their functions, are meant to be exemplary only, and are not meant to limit implementations of the inventions described and/or claimed in this document.

The computing device 1700 includes a processor 1710 (e.g., data processing hardware 36), memory 1720 (e.g., memory hardware 38), a storage device 1730, a high-speed interface/controller 1740 connecting to the memory 1720 and high-speed expansion ports 1750, and a low speed interface/controller 1760 connecting to a low speed bus 1770 and a storage device 1730. Each of the components 1710, 1720, 1730, 1740, 1750, and 1760, are interconnected using various busses, and may be mounted on a common motherboard or in other manners as appropriate. The processor 1710 (e.g., data processing hardware) can process instructions for execution within the computing device 1700, including instructions stored in the memory 1720 or on the storage device 1730 to display graphical information for a graphical user interface (GUI) on an external input/output device, such as display 1780 coupled to high speed interface 1740. In other implementations, multiple processors and/or multiple buses may be used, as appropriate, along with multiple memories and types of memory. Also, multiple computing devices 1700 may be connected, with each device providing portions of the necessary operations (e.g., as a server bank, a group of blade servers, or a multi-processor system). The processor 1710 may execute the intermediate waypoint generator 120 of FIGS. 1 and 4.

The memory 1720 stores information non-transitorily within the computing device 1700. The memory 1720 may be a computer-readable medium, a volatile memory unit(s), or non-volatile memory unit(s). The non-transitory memory 1720 may be physical devices used to store programs (e.g., sequences of instructions) or data (e.g., program state information) on a temporary or permanent basis for use by the computing device 1700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1730 is capable of providing mass storage for the computing device 1700. In some implementations, the storage device 1730 is a computer-readable medium. In various different implementations, the storage device 1730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1720, the storage device 1730, or memory on processor 1710.

The high speed controller 1740 manages bandwidth-intensive operations for the computing device 1700, while the low speed controller 1760 manages lower bandwidth-intensive operations. Such allocation of duties is exemplary only. In some implementations, the high-speed controller 1740 is coupled to the memory 1720 and to the high-speed expansion ports 1750, which may accept various expansion cards (not shown). In some implementations, the low-speed controller 1760 is coupled to the storage device 1730 and a low-speed expansion port 1790. The low-speed expansion port 1790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
   receiving, at data processing hardware of a robot, a navigation route that is based on one or more locations of one or more obstacles in an environment of the robot, the navigation route comprising a first waypoint and a second waypoint;
   receiving, at the data processing hardware, from an image sensor, image data associated with the environment;
   determining, by the data processing hardware, a plurality of paths from the first waypoint to the second waypoint based on the image data;
   selecting, by the data processing hardware, a path from the plurality of paths, the path comprising at least one intermediate waypoint between the first waypoint and the second waypoint, wherein the at least one intermediate waypoint and at least one of the first waypoint or the second waypoint are generated using different data; and
   instructing, by the data processing hardware, navigation of the robot from a starting location to a destination location in the environment via the first waypoint, the at least one intermediate waypoint, and the second waypoint.

2. The computer-implemented method of claim 1, further comprising:
   comparing a first path of the plurality of paths to a second path of the plurality of paths, wherein selecting the path is based on comparing the first path to the second path.

3. The computer-implemented method of claim 1, further comprising:
   determining a first rotation associated with a first path of the plurality of paths; and
   determining a second rotation associated with a second path of the plurality of paths, wherein selecting the path is based on the first rotation and the second rotation.

4. The computer-implemented method of claim 1, further comprising:
   adding the at least one intermediate waypoint to the navigation route.

5. The computer-implemented method of claim 1, wherein the first waypoint is associated with the starting location, and wherein the second waypoint is associated with the destination location.

6. The computer-implemented method of claim 1, wherein a first portion of the environment between the first waypoint and the at least one intermediate waypoint is associated with a first yaw configuration, and wherein a second portion of the environment between the at least one intermediate waypoint and the second waypoint is associated with a second yaw configuration.

7. The computer-implemented method of claim 1, wherein the image data is indicative of one or more additional obstacles.

8. The computer-implemented method of claim 1, wherein the plurality of paths comprises two or more paths around one or more additional obstacles.

9. The computer-implemented method of claim 1, wherein the navigation route is further based on a map indicative of the one or more locations of the one or more obstacles.

10. The computer-implemented method of claim 1, wherein each of the plurality of paths comprises a respective at least one intermediate waypoint between the first waypoint and the second waypoint.

11. The computer-implemented method of claim 1, wherein instructing navigation of the robot comprises instructing navigation of the robot such that the robot maintains at least a threshold distance from the one or more obstacles.

12. The computer-implemented method of claim 1, wherein the image data is indicative of one or more updated locations of the one or more obstacles.

13. The computer-implemented method of claim 1, wherein receiving the image data comprises receiving the image data based on navigation of at least a portion of the environment by the robot.

14. The computer-implemented method of claim 13, wherein selecting the path comprises selecting the path in real time.

15. A system comprising:
   data processing hardware; and
   memory in communication with the data processing hardware, the memory storing instructions that when executed on the data processing hardware cause the data processing hardware to:
      receive a navigation route that is based on one or more locations of one or more obstacles in an environment of a robot, the navigation route comprising a first waypoint and a second waypoint;
      receive, from an image sensor, image data associated with the environment;
      determine a plurality of paths from the first waypoint to the second waypoint based on the image data;
      select a path from the plurality of paths, the path comprising at least one intermediate waypoint between the first waypoint and the second waypoint, wherein the at least one intermediate waypoint and at least one of the first waypoint or the second waypoint are generated using different data; and
      instruct navigation of the robot from a starting location to a destination location in the environment via the first waypoint, the at least one intermediate waypoint, and the second waypoint.

16. The system of claim 15, wherein execution of the instructions further causes the data processing hardware to:
   compare a first path of the plurality of paths to a second path of the plurality of paths, wherein selecting the path is based on comparing the first path to the second path.

17. The system of claim 15, wherein a first portion of the environment between the first waypoint and the at least one intermediate waypoint is associated with a first yaw configuration, and wherein a second portion of the environment between the at least one intermediate waypoint and the second waypoint is associated with a second yaw configuration.

18. A robot comprising:
an image sensor;
at least two legs;
data processing hardware in communication with the image sensor; and
memory in communication with the data processing hardware, the memory storing instructions that when executed on the data processing hardware cause the data processing hardware to:
  receive a navigation route that is based on one or more locations of one or more obstacles in an environment of a robot, the navigation route comprising a first waypoint and a second waypoint;
  receive, from the image sensor, image data associated with the environment;
  determine a plurality of paths from the first waypoint to the second waypoint based on the image data;
  select a path from the plurality of paths, the path comprising at least one intermediate waypoint between the first waypoint and the second waypoint, wherein the at least one intermediate waypoint and at least one of the first waypoint or the second waypoint are generated using different data; and
  instruct navigation of the robot from a starting location to a destination location in the environment via the first waypoint, the at least one intermediate waypoint, and the second waypoint.

19. The robot of claim 18, wherein the image data is indicative of one or more additional obstacles.

20. The robot of claim 18, wherein the image data is indicative of one or more updated locations of the one or more obstacles.

21. The computer-implemented method of claim 1, further comprising:
  determining a location within the path to place the at least one intermediate waypoint.

22. The computer-implemented method of claim 1, further comprising:
  generating one or more step locations associated with the path based on selecting the path, wherein instructing navigation of the robot comprises instructing the robot to place one or more feet of the robot at the one or more step locations.

23. The computer-implemented method of claim 1, wherein each of the first waypoint, the at least one intermediate waypoint, and the second waypoint are associated with at least one of a respective yaw value, a respective time value, or a respective location on a ground surface of the environment.

* * * * *